(12) United States Patent
Dawant et al.

(10) Patent No.: US 7,519,209 B2
(45) Date of Patent: Apr. 14, 2009

(54) SYSTEM AND METHODS OF ORGAN SEGMENTATION AND APPLICATIONS OF SAME

(75) Inventors: Benoit M. Dawant, Nashville, TN (US); Zhujiang Cao, Plymouth, MN (US)

(73) Assignee: Vanderbilt University, Nashville, TN (US)

( * ) Notice: Subject to any disclaimer, the term of this patent is extended or adjusted under 35 U.S.C. 154(b) by 905 days.

(21) Appl. No.: 11/165,565

(22) Filed: Jun. 23, 2005

(65) Prior Publication Data

US 2006/0013482 A1   Jan. 19, 2006

Related U.S. Application Data

(60) Provisional application No. 60/582,090, filed on Jun. 23, 2004.

(51) Int. Cl.
*G06K 9/00* (2006.01)
*A61B 6/00* (2006.01)

(52) U.S. Cl. .......................... 382/128; 382/199; 378/21

(58) Field of Classification Search ................. 382/128, 382/129, 130, 131, 132, 133, 134, 168, 171, 382/173, 181, 194, 199, 203, 224, 232, 254, 382/274, 276, 286, 287, 288, 290, 291, 292, 382/305, 312; 378/4, 18, 20, 21, 23
See application file for complete search history.

(56) References Cited

U.S. PATENT DOCUMENTS 7,162,065 B2 * 1/2007 Ladak et al. ................. 382/131
7,187,800 B2 * 3/2007 Hibbard ....................... 382/173
7,289,653 B2 * 10/2007 Zhang et al. ................. 382/131
7,359,535 B2 * 4/2008 Salla et al. ................... 382/128
7,388,973 B2 * 6/2008 Fidrich et al. ............... 382/128
7,466,848 B2 * 12/2008 Metaxas et al. ............. 382/128

OTHER PUBLICATIONS

Chan, T.F. et al., "Active contours without edges," *IEEE Trans. Image Processing*, vol. 10, No. 2, pp. 266-276, 2001.*
Adalsteinsson, D. et al., "The fast construction of extension velocities in level set methods," *Journal of Computational Physics*, vol. 148, No. 1, pp. 2-22, 1999.
Malladi, R. et al., "Shape modeling with front propagation: A level set approach," *IEEE Trans. Pattern Analysis and Machine Intelligence*, vol. 17, No. 2, pp. 158-175, 1995.
Pan, S. et al., "Automatic 3D segmentation of the liver from abdominal CT images: a level set approach," *Proceedings of SPIE'2001: Medical Imaging*, vol. 4322, pp. 128-138, 2001.
Sethian, J.A. "A fast marching level set method for monotonically advancing fronts," *Proceedings of the National Academy of Sciences*, vol. 93, No. 4, pp. 1591-1595, 1996.

* cited by examiner

*Primary Examiner*—Seyed Azarian
(74) *Attorney, Agent, or Firm*—Morris Manning Martin LLP; Tim Tingkang Xia, Esq.

(57) ABSTRACT

A method for segmentation of an organ of a living subject with a variable shape and boundary and surrounded by structures and tissues in connection with an image containing the organ. In one embodiment, the method includes the steps of initializing a contour inside the organ in the image, introducing a speed function that is capable of accumulating spatial and temporal information of a propagating front of the contour, and evolving the contour toward the boundary of the organ using the introduced speed function so as to segment the organ.

24 Claims, 20 Drawing Sheets

SYSTEM AND METHODS OF ORGAN SEGMENTATION AND APPLICATIONS OF SAME

CROSS-REFERENCE TO RELATED PATENT APPLICATION

This application claims the benefit, pursuant to 35 U.S.C. §119(e), of provisional U.S. patent application Ser. No. 60/582,090, filed Jun. 23, 2004, entitled "METHODS OF ORGAN SEGMENTATION AND APPLICATIONS OF SAME," by Benoit M. Dawant, and Zhujiang Cao, which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [11] represents the 11th reference cited in the reference list, namely, B. M. Dawant, S. Pan, and R. Li, "Robust segmentation of medical images using geometric deformable models and a dynamic speed function", *Proceedings of MICCAI'2001*, pp. 1040-1047, 2001.

STATEMENT OF FEDERALLY-SPONSORED RESEARCH

The present invention was made with Government support under a contract NIH-CA-91352 awarded by National Institutes of Health. The United States Government may have certain rights to this invention pursuant to the grant.

FIELD OF THE INVENTION

The present invention generally relates to organ segmentation, and in particular to segmentation with a variable shape and boundary and surrounded by structures and tissues such as liver.

BACKGROUND OF THE INVENTION

Accurate liver segmentation is important for a number of medical applications such as volumetric measurement prior to liver surgery or transplant, and for the creation of surfaces to be used in image-guided surgical systems. In the latter, surfaces created from pre-operative tomographic image volumes are registered to points acquired intra-operatively. Liver segmentation from both magnetic resonance (hereinafter "MR") and computed tomography (hereinafter "CT") images represents a significant segmentation challenge because the liver is surrounded by structures and tissues that have intensity values similar to its own and its shape is extremely variable. Despite these difficulties, several approaches have been proposed. For instance, it is understood that Bae et al [1] developed a method to sequentially segment the liver from abdomen cross-sections starting with a reference image. It is understood that the authors rely on classical image processing steps such as thresholding and connected component labeling followed by a post-processing stage in which a priori information on the liver morphology is used. Moreoover, it is understood that Gao et al [2] take a similar approach and use parametrically deformable contours. Other approaches based on sequences of image processing algorithms can be found in Chemouny et al [3], Inaoka et al [4], and Fishman et al [5]. In general, it is understood that these methods require a number of heuristics and parameter adjustments, which reduces their robustness. Montagnat and Delingette [6] have investigated the possibility of segmenting the liver from abdominal CT images by deforming a liver model, where a hybrid method that integrates global deformation and local deformation is employed. It is understood that the deformable model is thus shape constrained, and has been successfully applied in a limited number of livers. Recently, it is understood that Soler et al [7] have used this technique for automatic liver segmentation from spiral CT scans. In the approach, the skin, lungs, bones, kidneys, spleen, and liver are first extracted from the images using thresholding, topological, and geometric constraints, then liver segmentation is initialized by placing a liver model obtained from the visible human data set on the image and deforming it. For livers that have a shape similar to the liver model, this approach gives rise to good segmentation results. However, for livers that have an atypical shape (about 5 out of the 35 volumes tested), interactive adjustment of the initial model is required to produce acceptable results. The application of the deformable model in the visualization of hepatic vasculature and tumors has also been reported by Chou et al [8], without addressing quantitative accuracy of the segmentation. It is understood that Varma et al [9] have developed a semi-automatic procedure to segment liver along with its venous vessel tree from CT images, which a traditional level-set method with an intensity gradient-dependent speed function is used. The algorithm has been tested on seven volumes but no quantitative information on its performance is reported. Recently, a method based on geodesic deformable models combined with a-priori shape information to limit leakage problems into adjacent structures has been proposed [10].

Geometric deformable models have been proposed as an alternative to parametric deformable models such as snakes [11]. In the geometric deformable model, the evolution of an initial contour toward the true object boundary is considered as a front propagation problem. This permits the use of level set and fast marching methods introduced by Sethian [13] to model propagating fronts with curvature-dependent speeds. Following the level set formulation, the boundary of an object is embedded as the zero-level set of a time-dependent function $\Phi$ that is governed by the equation of $$\Phi_t + F|\nabla\Phi| = 0 \qquad (1)$$

where F is a speed function specifying the speed at which the contour evolves along its normal direction. As time progresses, the value of the function $\Phi$ evolves and the object's boundary is the zero level set of the function. One of the main advantages of this approach over traditional parametric deformable models is the ease with which topological adaptation can be handled. The main challenge of the front propagation methods is to develop an adequate speed function for a specific application. Malladi et al [14] have proposed a general model for image segmentation in which the speed function is defined as $$F = g_I(F_0 - \epsilon \kappa) \qquad (2)$$

where $g_I$ is a term derived from the image itself, which is used to stop the propagation of the contour near desired points such as points with high gradient or pre-specified intensity values, $\kappa$ represents the curvature of the front and acts as a regularization term, $F_0$ is a constant; and $\epsilon$ is a weighting parameter. A common expression for $g_I$ is in the form of $$g_I = e^{-\alpha |\nabla G_\sigma * I|}, \qquad (3)$$

where $G_\sigma * I$ denotes the convolution of the image with a Gaussian smoothing filter with standard deviation $\sigma$. This term is close to 1 over homogeneous areas and tends to zero over regions with large intensity gradients. It is designed to force fronts to propagate at constant speed over homogeneous regions and to slow them down at the boundary of these regions. However, unless hard thresholds are set on the value of $g_I$, i.e. $g_I$ is set to zero when the gradient exceeds a certain value), contours never stop completely. Given enough time, contours will eventually "leak" outside the desired regions. This problem has been recognized and a solution has been proposed [15] by introducing a new term called the doublet term $\nabla(\beta |\nabla G_\sigma * I|) \cdot \vec{N}$ into the level set formulation. The doublet term attracts contours toward boundaries. However, when a boundary is crossed, the doublet term also pulls back the contours towards the boundary. Although the doublet term offers a partial solution to the leakage problem, it is not very well adapted to situations with weak edges in noisy and non-uniform images. Indeed, to stop the front of the contour permanently at the structure boundary, the doublet term needs to be strong enough to offset the constant inflation term (i.e., the constant term $F_0$). To stop the contour at weak edges, this requires the selection of a large $\beta$ value, but a large value of $\beta$ tends to stop the contour at spurious edges within the structure. Finding the appropriate value for the parameter $\beta$ is difficult and often image dependent, which affects the robustness of algorithms that use this type of speed functions. Siddiqi et al [16] further address the leaking problem by introducing a speed function that combines length minimizing and area minimizing terms. It can prevent leakage over small gaps but is of limited use for large gaps in the edge map. On the other hand, speed functions that depend directly or indirectly on the gradient of the images are challenged by images in which object boundaries are ill-defined.

Several methods that are less dependent on the gradient of the images have been proposed recently. These methods typically integrate regional and/or shape constraints into the traditional geometric model. Suri et al [17] have introduced an additional propagation force that is based on regional fuzzy clustering. Paragios [18] has proposed a new framework called geodesic active region, which introduces an energy function incorporates both boundary probability and regional probability that are based on a Bayesian model. Chan et al [19] have also proposed a level-set approach in which the functional being minimized does not depend on edges but on the distribution of intensities within the contours. A similar regional geometric model segmenting images via coupled curve evolution equations has recently been proposed by Yezzi et al [20]. The merit of these methods lies in the fact that the curve evolution, which also can be viewed as pixel/voxel classification, is controlled by competition between different classes in the feature domain (intensity, texture etc.). As a result, these algorithms are capable of segmentation of images with very weak edges or even no edges (gradient boundary). The other advantage of regional based methods is that the initial positions are not as sensitive as gradient methods. However, these methods are limited in medical applications such as liver segmentation where livers are connected to tissues with similar intensity and texture, and are surrounded by structures with vastly different features. Another interesting method proposed by Leventon et al [21] and Tsai et al [22] incorporates global shape constraints into the geometric active contour model. These authors create shape models by performing principle component analysis on level set representations of the training set, which allows them to constrain the segmentation process by integrating global prior shape information. However, the effectiveness of these methods on organs with large inter-subject variations, such as liver, remains to be determined.

Therefore, a heretofore unaddressed need exists in the art to address the aforementioned deficiencies and inadequacies.

SUMMARY OF THE INVENTION

In one aspect, the present invention relates to a method for segmentation of an organ of a living subject with a variable shape and boundary and surrounded by structures and tissues in connection with an image containing the organ. The organ includes at least a part of a liver, a heart, a kidney, a stomach, or a lung of a living subject. The image comprises a magnetic resonance image or a computed tomography image. The boundary of the organ is embedded as a zero level set of an embedding function, $\Phi$.

In one embodiment, the method includes the steps of (a) initializing a contour inside the organ in the image, (b) introducing a speed function that is capable of accumulating spatial and temporal information of a propagating front of the contour, where the speed function has a term, $g_0$, (c) defining an image-dependent static term, $g_{base}$, (d) setting the term $g_0 = g_{base}$, (e) computing $\{(x,y,z) | \Phi(x,y,z) = 0\}$ at iteration n, so as to obtain a set of points in the zero level set of the embedding function $\Phi$, where n=1, 2, 3, . . . , and coordinates (x, y, z) represent a point on the propagating front of the contour, (f) retrieving the static term $g_{base}(x, y, z)$ for each of the set of points in the zero level set of the embedding function $\Phi$, (g) extending the retrieved static term $g_{base}(x, y, z)$ to a narrow band in which the embedding function $\Phi$ is computed so as to generate an extended term $g_{ext}$, (h) updating the term $g_0 = g_0 g_{ext}$ so as to update the speed function, (i) computing the embedding function $\Phi$ at iteration (n+1) using the updated speed function, and (j) iteratively repeating steps (e)-(i) for a predetermined number of iterations or until the propagating front of the contour does not move. The front of the contour corresponds to the boundary of the organ.

In one embodiment, the extending step has the step of computing the extended term $g_{ext}$ that satisfies an equation of $\nabla g_{ext} \cdot \nabla \theta = 0$, where $\nabla \theta$ is a standard signed distance function computed from the zero level set of the embedding function $\Phi$, and the computing step is performed with a fast marching method. In one embodiment, the extended term $g_{ext}(x, y,$ $z) = g_{base}(c(x, y, z))$ for points (x,y,z) close to the zero level set, where c(x, y, z) is the closest point in the zero level set of the embedding function $\Phi$.

In one embodiment, the embedding function $\Phi$ is governed by a level set equation, $\Phi_t + F|\nabla\Phi| = 0$, where the speed function $F = g_0(1-\epsilon\kappa)$. In another embodiment, the embedding function $\Phi$ is governed by a level set equation, $\Phi_t - \text{Sign}(g_{base})((|g_0|-\epsilon\kappa)|\nabla\Phi|) = 0$, where the speed function $F = -\text{Sign}(g_{base})(|g_0|-\epsilon\kappa)$, and $\text{Sign}(g_{base})$ is a sign function of $g_{base}$. The static term $g_{base}$ is in the form of $g_{base} = g_{grad}g_{gray}$, where $g_{grad}$ and $g_{grey}$ include intensity gradient information and gray value information of the image, respectively.

In one embodiment, the method also includes the step of localizing an inner boundary of the structures surrounding the organ as a shape constraint for the propagating front of the contour, where the structures have a set of ribs. The localizing step has the steps of converting the image into a binary image, and localizing a skin surface from the converted binary image, where the localized skin surface has a skin circumference. In one embodiment, the converting step comprises the step of thresholding the image with a threshold, $I_{skin}$. Furthermore, the localizing step has the steps of identifying a set of candidate pixels, $P_{candidate} = \{P_{candidate}(j)\}$, from the converted binary image, $j = 1, 2, \ldots, N_c$, $N_c$ being the number of the set of candidate pixels $P_{candidate}$, and determining a set of rib pixels, $P_{rib} = \{P_{rib}(i)\}$, from the set of candidate pixels $P_{candidate}$, each of the set of rib pixels $P_{rib}$ corresponding to one of the set of ribs in the converted binary image, $i = 1, 2, \ldots, N_r$, $N_r$ being the number of the set of rib pixels $P_{rib}$. In one embodiment, the set of rib pixels $P_{rib} = \{(x, y) | (x, y) \in$ $qjP_{candidate}$, and $D_{skin}(x, y) < d_{rib\ max}\}$, $d_{ribmax}$ being a maximum possible distance from a rib to the skin circumference. Moreover, the localizing step has the steps of segmenting the set of rib pixels $P_{rib}$ into a plurality of sections, $S = \{S(k)\}$, along the skin circumference in the converted binary image, $k = 1, 2, \ldots, N_s$, $N_s$ being the number of the plurality of sections S, calculating distances of each rib pixel in a segmented section S(k) to its closest skin pixels on the skin circumference in the segmented section S(k) so as to obtain the mean value $\overline{D}_{skin}(k)$ and the standard deviation $D_{std}(k)$ of these distances in the segmented section S(k), respectively, $k = 1, 2, \ldots, N_s$, and defining a skin-rib distance, $d_{skin-rib}(k) = \overline{D}_{skin}(k) + 2D_{std}(k)$ for the segmented section S(k), $k = 1, 2, \ldots, N_s$. Additionally, the localizing step has the step of connecting the plurality of segmented sections S together to form the inner boundary of the plurality of ribs, $P_{in} = \{(x, y) | d(x, y) = Td_{skin-rib}(C\_Map(x, y))\}$, where d(x,y) is distance of pixel (x,y) to the skin circumference, C_Map(x,y) is the closest point of pixel (x,y) on the skin circumference, and $Td_{skin-rib}$ is a lookup table that stores the skin-rib distance $d_{skin-rib}$ for each pixel along the skin circumference, where the connecting step is performed with an interpolation scheme.

In one embodiment, the method further includes the step of performing a stiff band algorithm on the propagating front of the contour. The performing step, in one embodiment, has the steps of (i) defining a neighborhood for each of pixels $\{P_i\}$ along the contour, where $P_i$ represents the ith pixel on the contour, $i = 1, 2, \ldots, N$, N being the number of the pixels, such that the neighborhood includes a set of pixels that are within $\pm\epsilon$ pixels, $\epsilon$ being a non-zero positive number, (ii) dividing the pixels of the neighborhood for $P_i$ into a first set of pixels that are in front of pixel $P_i$ along a propagating direction of the contour, and a second set of pixels that are behind of pixel $P_i$ along the propagating direction of the contour, (iii) defining a speed limit v to classify the neighborhood into several possible states, (vi) for each state segmenting the neighborhood of $P_i$, and (v) iteratively repeating steps (ii)-(vi) for all pixels $\{P_i\}$.

In another aspect, the present invention relates to software stored on a computer readable medium for causing a computing system to perform functions that segment a region of interest of an organ in an image. In one embodiment, the functions includes (a) initializing a contour inside the organ in the image, (b) introducing a speed function that is capable of accumulating spatial and temporal information of a propagating front of the contour, where the speed function has a term, $g_0$, (c) defining an image-dependent static term, $g_{base}$, (d) setting the term $g_0 = g_{base}$, (e) computing $\{(x,y,z) | \Phi(x,y,z) = 0\}$ at iteration n, so as to obtain a set of points in the zero level set of the embedding function $\Phi$, where $n = 1, 2, 3, \ldots$, and coordinates (x, y, z) represent a point on the propagating front of the contour, (f) retrieving the static term $g_{base}(x, y, z)$ for each of the set of points in the zero level set of the embedding function $\Phi$, (g) extending the retrieved static term $g_{base}(x, y, z)$ to a narrow band in which the embedding function $\Phi$ is computed so as to generate an extended term $g_{ext}$, (h) updating the term $g_0 = g_0 g_{ext}$ so as to update the speed function, (i) computing the embedding function $\Phi$ at iteration (n+1) using the updated speed function, and (j) iteratively repeating steps (e)-(i) for a predetermined number of iterations or until the propagating front of the contour does not move. The front of the contour corresponds to the boundary of the region of interest of an organ.

In one embodiment, the functions further comprise localizing an inner boundary of structures surrounding the organ as a shape constraint for the propagating front of the contour, and performing a stiff band algorithm on the propagating front of the contour.

In yet another aspect, the present invention relates to a method for segmentation of an organ of a living subject with a variable shape and boundary and surrounded by structures and tissues in connection with an image containing the organ. The boundary of the organ is embedded as a zero level set of an embedding function, $\Phi$, which governed by a level set equation. In one embodiment, the level set equation takes the form of $\Phi_t + F|\nabla\Phi| = 0$, where the speed function $F = g_0(1-\epsilon\kappa)$. In another embodiment, the level set equation is in the form of $\Phi_t - \text{Sign}(g_{base})((|g_0|-\epsilon\kappa)\nabla\Phi|) = 0$, where the speed function $F = -\text{Sign}(g_{base})(|g_0|-\epsilon\kappa)$, and $\text{Sign}(g_{base})$ is a sign function of $g_{base}$. The static term $g_{base}$ is defined by $g_{base} = g_{grad}g_{gray}$, where $g_{grad}$ and $g_{grey}$ include intensity gradient information and gray value information of the image, respectively.

In one embodiment, the method includes the steps of initializing a contour inside the organ in the image, introducing a speed function that is capable of accumulating spatial and temporal information of a propagating front of the contour, and evolving the contour toward the boundary of the organ using the introduced speed function so as to segment the organ.

The evolving step includes an iterative process. In one embodiment, the iterative process comprises the steps of (a) defining an image-dependent static term, $g_{base}$, (b) setting $g_0=g_{base}$, where $g_0$ is a term used in the speed function, (c) computing $\{(x,y,z)|\Phi(x,y,z)=0\}$ at iteration n, so as to obtain a set of points in the zero level set of an embedding function $\Phi$, where n=1, 2, 3, . . . , and coordinates (x, y, z) represent a point on the propagating front of the contour, (d) retrieving the static term $g_{base}(x, y, z)$ for each of the set of points in the zero level set of the embedding function $\Phi$, (e) extending the retrieved static term $g_{base}(x, y, z)$ to a narrow band in which the embedding function $\Phi$ is computed so as to generate an extended term $g_{ext}$, (f) updating the term $g_0=g_0 g_{ext}$ so as to update the speed function, (g) computing the embedding function $\Phi$ at iteration (n+1) using the updated speed function, and (h) iteratively repeating steps (c)-(g) for a predetermined number of iterations or until the propagating front of the contour does not move.

The method further includes the steps of localizing an inner boundary of the structures surrounding the organ as a shape constraint for the propagating front of the contour, and performing a stiff band algorithm on the propagating front of the contour.

In a further aspect, the present invention relates to software stored on a computer readable medium for causing a computing system to perform functions that segment a region of interest of an organ in an image. In one embodiment, the functions include initializing a contour inside the region of interest in the image, introducing a speed function that is capable of accumulating spatial and temporal information of a propagating front of the contour, and evolving the contour toward the boundary of the organ using the introduced speed function so as to segment the organ, where the boundary of the organ is embedded as a zero level set of an embedding function, $\Phi$, governed by a level set equation.

In one embodiment, the evolving function comprises (a) defining an image-dependent static term, $g_{base}$, (b) setting $g_0=g_{base}$, where $g_0$ is a term used in the speed function, c) computing $\{(x,y,z)|\Phi(x,y,z)=0\}$ at iteration n, so as to obtain a set of points in the zero level set of an embedding function $\Phi$, where n=1, 2, 3, . . . , and coordinates (x, y, z) represent a point on the propagating front of the contour, (d) retrieving the static term $g_{base}(x\ y, z)$ for each of the set of points in the zero level set of the embedding function $\Phi$, (e) extending the retrieved static term $g_{base}(x, y, z)$ to a narrow band in which the embedding function $\Phi$ is computed so as to generate an extended term $g_{ext}$, (f) updating the term $g_0=g_0 g_{ext}$ so as to update the speed function, (g) computing the embedding function $\Phi$ at iteration (n+1) using the updated speed function, and (h) iteratively repeating steps (c)-(g) for a predetermined number of iterations or until the propagating front of the contour does not move.

The functions further comprise localizing an inner boundary of structures surrounding the organ as a shape constraint for the propagating front of the contour, and performing a stiff band algorithm on the propagating front of the contour.

In yet a further aspect, the present invention relates to a system for performing functions that segment a region of interest of an organ of a living subject in an image. In one embodiment, the system includes a controller that performs the steps of initializing a contour inside the region of interest in the image, introducing a speed function that is capable of accumulating spatial and temporal information of a propagating front of the contour, and evolving the contour toward the boundary of the organ using the introduced speed function so as to segment the organ, where the boundary of the organ is embedded as a zero level set of an embedding function, $\Phi$, governed by a level set equation.

These and other aspects of the present invention will become apparent from the following description of the preferred embodiment taken in conjunction with the following drawings, although variations and modifications therein may be affected without departing from the spirit and scope of the novel concepts of the disclosure.

DETAILED DESCRIPTION OF THE INVENTION

Figure 1:
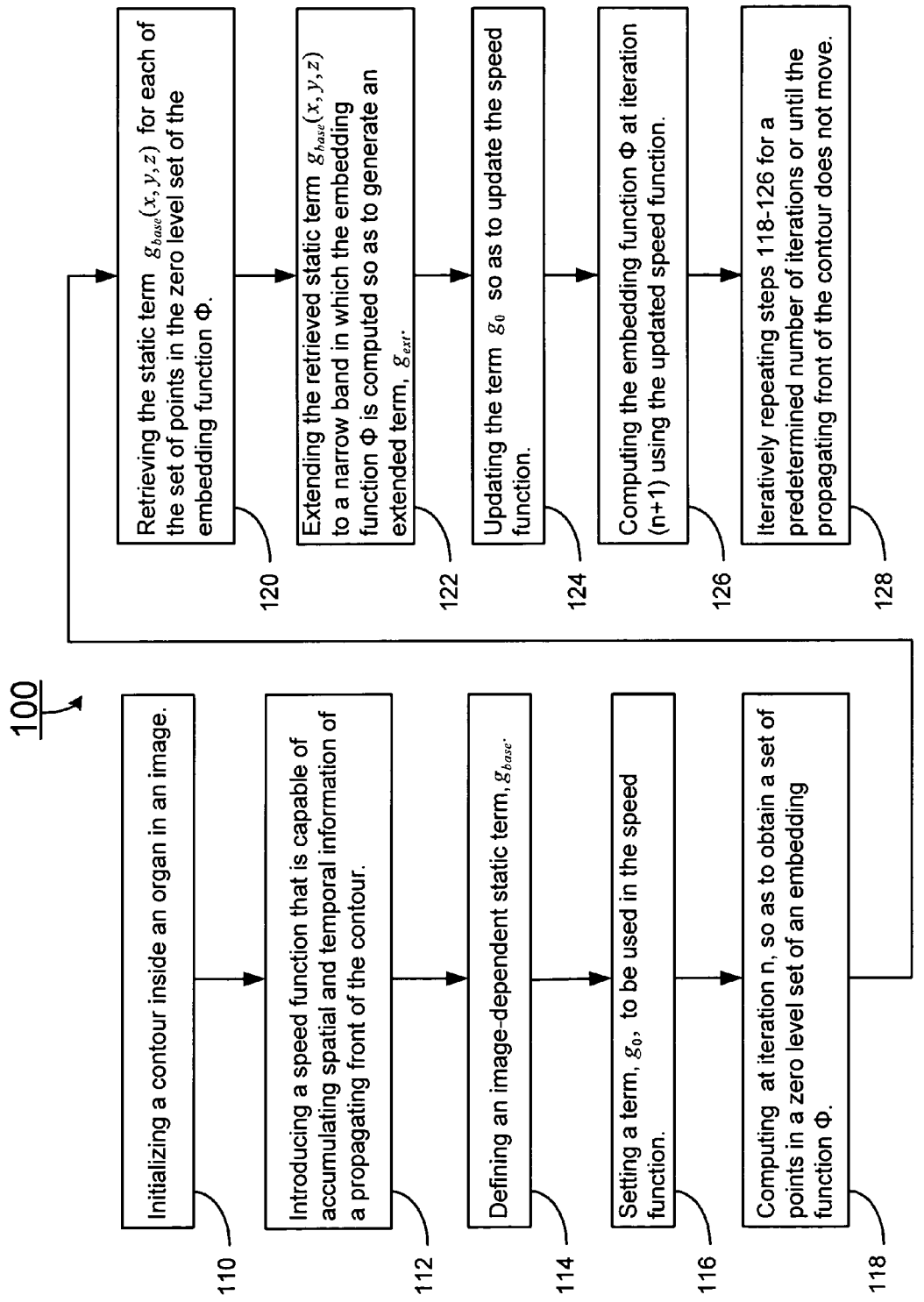
FIG. 1 shows a flowchart for organ segmentation according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention. Additionally, some terms used in this specification are more specifically defined below.

Definitions

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing various embodiments of the invention and how to practice the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "living subject" refers to a human being such as a patient, or an animal such as a lab testing monkey.

As used herein, the term "organ" refers to a differentiated part of an organism of a living subject, such as liver, heart, or lung.

As used herein, the term "segmentation" refers to the process of dividing an organ image into segments.

Overview of the Invention

The present invention, in one aspect, relates to a method for segmentation of an organ of a living subject with a variable shape and boundary and surrounded by structures and tissues in connection with an image containing the organ. The organ includes at least a part of a liver, a heart, a kidney, a stomach, or a lung of a living subject. The image of the organ comprises a two-dimensional (hereinafter "2D") image of the organ or a three-dimensional (hereinafter "3D") image of the organ that has sufficient resolution for a medical application. In one embodiment, the image of the organ includes an MR image. In another embodiment, the image of the organ includes a CT image.

Segmentations of an organ may be performed within geometric-deformable model frameworks in which a front of an initial contour in an image of the organ is propagated toward a boundary of the organ with curvature-dependent speeds that is characterized with a speed function. However, as indicated above, one of the major problems one faces when designing geometric-deformable models is the definitions of speed functions that allow a front of a contour to propagate over relatively homogeneous regions within an organ and to stop at often ill-defined boundaries of this organ. Parameter values selected to guarantee immobilization of the front at the boundaries also often lead to premature immobilization because of noise or spurious boundaries. The deficiencies may be addressed by initializing contours close to the actual edge of the organ. However, it may limit the robustness and ease of the use of the geometric-deformable algorithm.

The basic tenet in the method of the present invention is no need of designing a speed function that is identically equal to zero over an organ boundary so as to stop a front of a contour. If information of the front of the contour is being tracked and the tracked information is incorporated into a definition of a speed function therein, it is sufficient to decelerate the front of the contour over possible edge pixels. Specifically, if the front of the contour passes over isolated points that are likely to be a boundary of the organ, it keeps propagating. If it passes over several such points in sequence it slows down exponentially until it is permanently stopped. Thus, as opposed to other approaches in which the speed function is spatially dependent but independent of the propagation path, the speed function according to one embodiment of the present invention is dynamically modified at every iteration. The front of the contour is slowed down by "accumulating evidence" that it is over a boundary of the organ, the speed function is called the accumulative speed function.

Referring now to FIG. 1, a flowchart 100 of the method for segmentation of an organ of a living subject from an image containing the organ is shown according to one embodiment of the present invention, where a level set framework is utilized to practice the present invention. Accordingly, the boundary of the organ is embedded as a zero level set of an embedding function, $\Phi$. The method, in one embodiment, includes the following steps: at step 110, a contour is initialized inside the organ in the image. At step 112, a speed function is introduced, which is capable of accumulating spatial and temporal information of a propagating front of the contour. As described below, the speed function is being updated from iteration to iteration. At step 114, an image-dependent static term, $g_{base}$, is defined. And $g_0 = g_{base}$ is set at step 116, where $g_0$ is a term used in the speed function. At step 118, for iteration n, $\{(x,y,z)|\Phi(x,y,z)=0\}$ is computed so as to obtain a set of points in the zero level set of an embedding function $\Phi$, where n=1, 2, 3, . . . , and coordinates (x, y, z) represent a point on the propagating front of the contour. At step 120, the static term $g_{base}(x, y, z)$ is retrieved for each of the set of points in the zero level set of the embedding function $\Phi$. The retrieved static term $g_{base}(x, y, z)$ is extended to a narrow band in which the embedding function $\Phi$ is computed so as to generate an extended term $g_{ext}$ at step 122. At step 124, the term $g_0$ is updated by $g_0 = g_0 g_{ext}$ so as to update the speed function. At step 126, the embedding function $\Phi$ is computed at iteration (n+1) using the updated speed function. And at step 128, steps 118-126 are iteratively repeated for a predetermined number of iterations or until the propagating front of the contour does not move. The front of the contour corresponds to the boundary of the organ.

In one embodiment, the extended term $g_{ext}$ satisfies an equation of $$\nabla g_{ext} \cdot \nabla \theta = 0, \quad (4)$$

where $\nabla \theta$ is a standard signed distance function computed from the zero level set of the embedding function $\Phi$. Equation (4) is solved with a fast marching method [23, 24], which permits the simultaneous calculation of the distance function $\nabla \theta$ and of the extended term $g_{ext}$. In one embodiment, the extended term $g_{ext}(x, y, z) = g_{base}(c(x, y, z))$ for points (x,y,z) close to the zero level set, where c(x, y, z) is the closest point in the zero level set of the embedding function $\Phi$.

Figure 2:
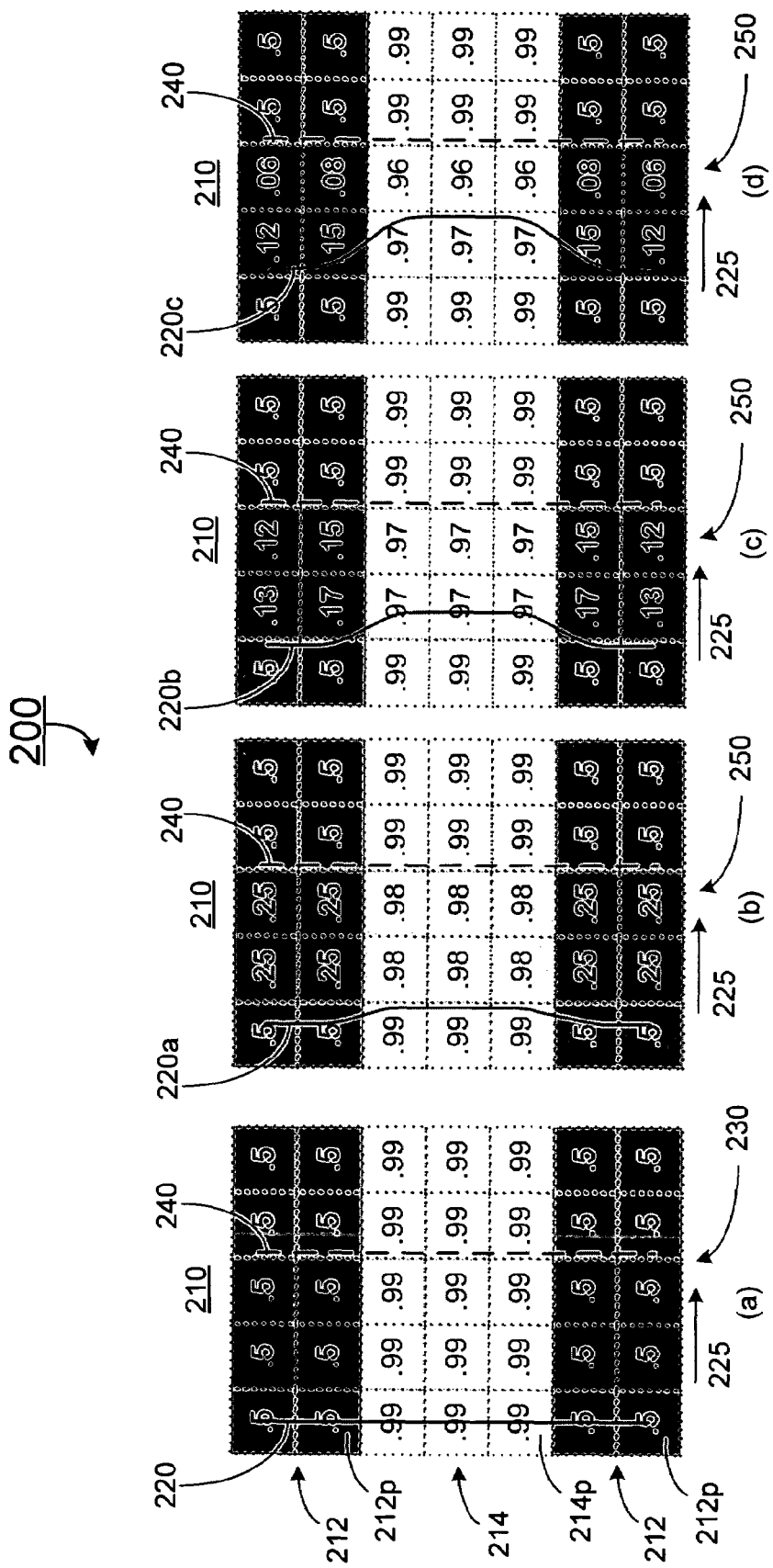
FIG. 2 shows schematically accumulative processes for updating a speed function according to one embodiment of the present invention.

Referring to FIG. 2, an accumulating process 200 for updating a speed function is illustrated according to one embodiment of the present invention. The image shown in FIG. 2 corresponds to a 2D image 210 having a foreground region 214 and two background regions 212. Each grid in the image 210 represents a pixel 212p or 214p. A value in a grid of the image 210 corresponds to a value of an image-dependent static term $g_{base}$ 230 or a multiplicative term $g_0$ 250. As shown in FIG. 2, each of pixels 214p of the foreground region 214 is associated with a larger value of the image-dependent static term $g_{base}$ 230 or the multiplicative term $g_0$ 250, while each of pixels 212p of the background regions 212 is associated with a smaller value. FIG. 2a shows the values of the image-dependent static term $g_{base}$ 230, which is $g_{base}=0.5$ in the background regions 212 and $g_{base}=0.99$ in the foreground region 214, respectively, and an initial position of a contour represented by a straight vertical solid line 220. The contour 220 moves along a direction 225 from the left side to the right side of the image 210. The values of the image-dependent static term $g_{base}$ 230 is then set to be values of the multiplicative term $g_0$ 250. Values shown in FIG. 2b represent values of the multiplicative term $g_0$ after a first iteration (n=2). Specifically, the values of the multiplicative term $g_0$ 250 are computed by (i) extending the static term $g_{base}$ by two pixels from the contour 220 to the right side of the image 210, so as to obtain values of a extended multiplicative term $g_{ext}$, where the two pixels correspond to a width of a narrow band, and (ii) multiplying the extended multiplicative term $g_{ext}$ by the multiplicative term $g_0$ 250 so as to obtain updated values of $g_0 = g_0 g_{ext}$ in the narrow band. A boundary of the narrow band is represented by a straight vertical dashed line 240. In this exemplary embodiment, $g_{ext} = g_{base}$ is set in the narrow band. This gives rise to values of $g_0 = g_0 g_{ext} = 0.5*0.5$ and $g_0 = g_0 g_{ext} = 0.99*0.99$ for the background regions 212 and the foreground region 214, respectively, in the narrow band. As shown in FIG. 2b, the contour 220 moves along the direction 225 to a new location 220a of the contour 220 after the first iteration. In this embodiment, the contour 220 moves faster over the foreground region 214 than over the background regions 212. FIG. 2c shows values of the multiplicative term $g_0$ 250 after a second iteration (n=2). The values of $g_0$ 250 are obtained by first extending $g_{base}$ from the location 220a of the contour 220 after the first iteration to the boundary 240 of the narrow band so as to obtain the extended multiplicative term $g_{ext}$, where $g_{ext} = g_{base}$ is set in the exemplary embodiment. And then multiplying the values of $g_0$ 250 obtained at the first iteration by the values of the extended multiplicative term $g_{ext}$ results in an updated values of $g_0 = g_0 g_{ext}$ in the narrow band. This leads to a new value of $g_0 = g_0 g_{ext} = 0.99*0.98 = 0.97$ for a pixel located in the middle of the foreground region 214. Values for other pixels are computed by an interpolation scheme which satisfies equation (4). Accordingly, the contour 220 keeps moving along the direction 225 with different speeds in the background regions 212 and the foreground region 214, respectively, which its new position 220b after the second iteration is shown in FIG. 2c. FIG. 2d presents values of the multiplicative term $g_0$ 250 and a position 220c of the contour 220 after a third iteration (n=3). As shown in FIGS. 2a-2d, the contour 220 slows down more and more over the background regions 212, eventually coming to a complete halt because the value of $g_0$ 250 for the background regions 212 approaches zero very rapidly, as the iterations proceed. Over the foreground region 214, the front of the contour 220 keeps progressing. When the front reaches the boundary 240 of the narrow band, the whole process is reinitialized. Because the speed function is extended and multiplied with the base speed function only within the narrow band, sections of the contour 220 that have reached the boundary 240 of the narrow band when it is reinitialized will keep progressing. Sections of the contour 220 that have not reached the boundary 240 of the narrow band are stopped permanently. This is further illustrated in FIG. 3 for a one-dimensional (hereinafter "1D") case.

Figure 3:
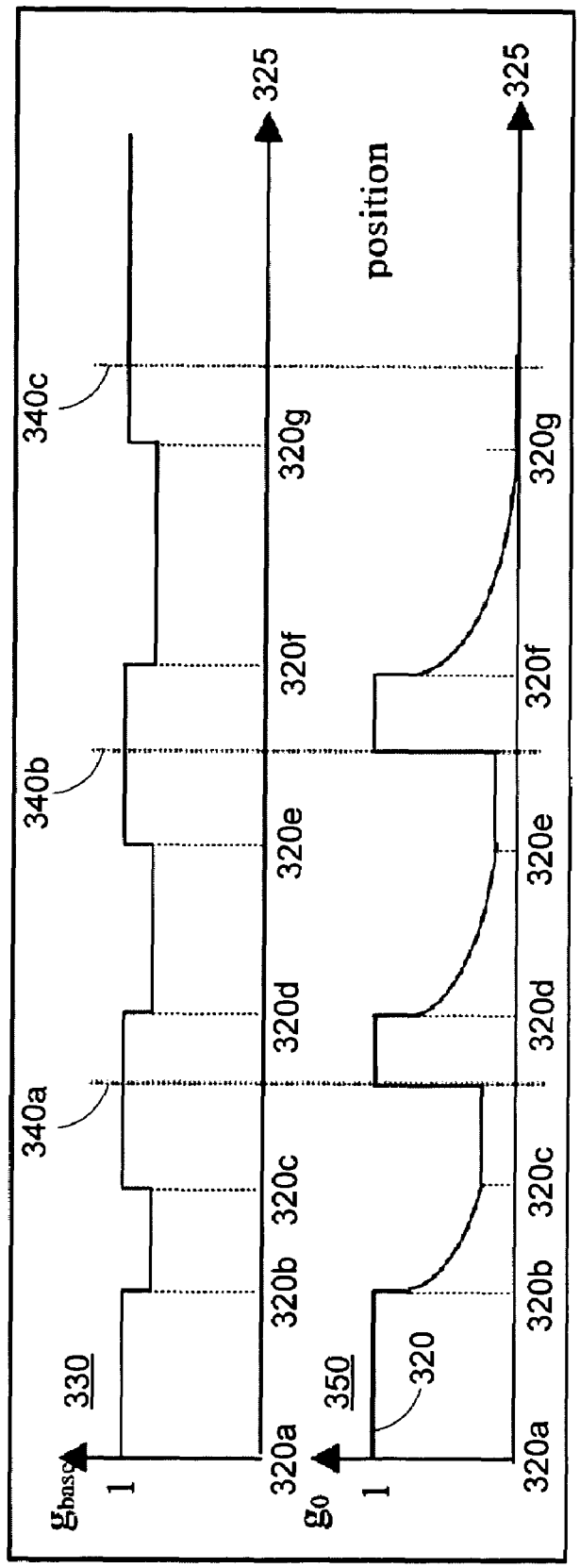
FIG. 3 shows schematically "stopped once stopped permanently" behavior of an accumulative speed function according to one embodiment of the present invention.

FIG. 3 shows a base speed function 330, in terms of $g_{base}$, and an actual speed function 350, in terms of $g_0$, according to one embodiment of the present invention. The dashed vertical lines 340a-340c are the points at which a narrow band is regenerated, respectively. The lines 340a-340c correspond to boundaries of the narrow band in 1D form. In this exemplary embodiment, a front 320 is progressing in position along a direction. At first, the front 320 moves at a speed of one in a region from point 320a to point 320b over which the base function 330 has a value of one. Then the front 320 enters into a region starting at point 320b and ending at point 320c over which the base speed function 330 is smaller than one. In the region, the actual speed function 350 thus decreases exponentially but does not reach zero before the front 320 reaches a region starting at point 320c and ending at the boundary 340a of the narrow band over which the base speed function 330 has a value of one again. In the region from point 320c to the boundary 340a of the narrow band, the front 320 keeps propagating at a constant speed, albeit at a speed smaller than the base speed. Once the front 320 reaches the boundary 340a of the narrow band, the process is reinitialized. Because the extension of $g_0$ stops at the boundary 340 of the narrow band, the speed ahead of the front 320 after the re-initialization is one again until point 320d from which the front 320 reaches a new interval. The new interval starts at point 320d and ends at point 320e over which the base speed function 330 is smaller than one. Over the new interval the speed function 350 slows down as it did the first time. Then the front 320 moves at a constant speed in a region from point 320e to the boundary 340b of the narrow band over which the base speed function 330 is equal to one. At the boundary 340b of the narrow band, the process is re-initialized, and the front 320 starts moving at a speed of one again. When the front 320 enters into a region from point 320f to point 320g, the speed function 350 slows down exponentially. Since the region from point 320f to point 320g with a lower base speed is wider, the front 320 never reaches the boundary 340c of the narrow band and it is stopped permanently.

The same processes are applicable to a 2D or 3D image. In those cases, sections of the contour or surface that encounter regions with low speed values over short distance slow down temporarily but eventually $g_0$ back to progress at their original speed. Sections of the contour or surface that encounter regions with low speed values over longer distance stop and do so permanently.

Figure 4:
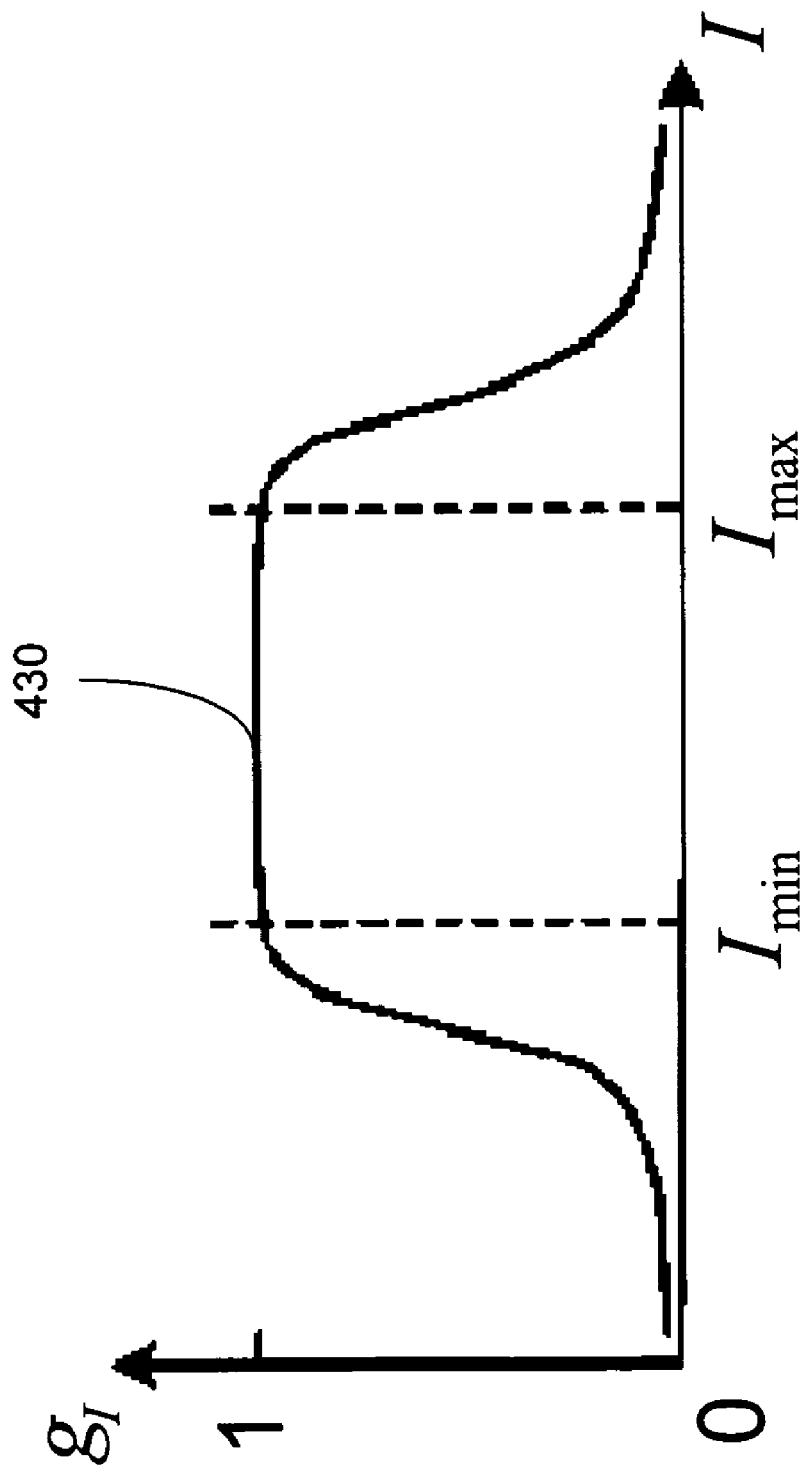
FIG. 4 shows a conventional base speed function.

In one embodiment, a static base speed function 430 is shown in FIG. 4. When a parameter I, associated with intensities and gradients of an image of an organ, satisfies the relationship of $I_{min} \leq I \leq I_{max}$, the base function 430 has a value of one. While the base function 330 is less than one and varies with the parameter I, when $0 < I < I_{min}$ and/or $I > I_{max}$.

In one embodiment, the speed function is defined as $F = g_0(1 - \epsilon\kappa)$, and the embedding function $\Phi$ is governed by equation (1). In this embodiment, the selections of the parameters are empirically and need to be adjusted manually for new types of image, which requires several trials.

In an alternative embodiment of the present invention, the parameters are semi-automatically computed. The evolution of the embedding function $\Phi$ is governed by the following equation:

$$\frac{\partial \phi}{\partial t} = \text{Sign}(g_{base}) \cdot ((|g_0| - \epsilon\kappa) \cdot |\nabla \phi|), \quad (5)$$

where $g_{base}$ is a base speed function, Sign ($g_{base}$) is the sign of the base (temporally invariant) speed function and $g_0$ is a value of an accumulative speed function, $\kappa$ represents a curvature of a contour and $\in$ is a weighting parameter. Instead of relying only on gray value information of an image where an organ is segmented, $g_{base}$ is now defined as follows:

$$g_{base} = g_{grad} \cdot g_{gray}, \quad (6)$$

where $g_{grad} = e^{-\alpha|\nabla G_\sigma * I|}$ and $|\nabla G_\sigma * I|$ is the magnitude of the intensity gradient of the image after convolution with a Gaussian smoothing filter with standard deviation $\sigma$, and $$g_{gray} = \begin{cases} 2e^{-\gamma|I - I_{min}|} - 1, & I \leq I_{min} \\ 1, & I_{min} \leq I \leq I_{max} \\ 2e^{-\gamma|I - I_{max}|} - 1, & I \geq I_{max} \end{cases} \quad (7)$$

Figure 5:
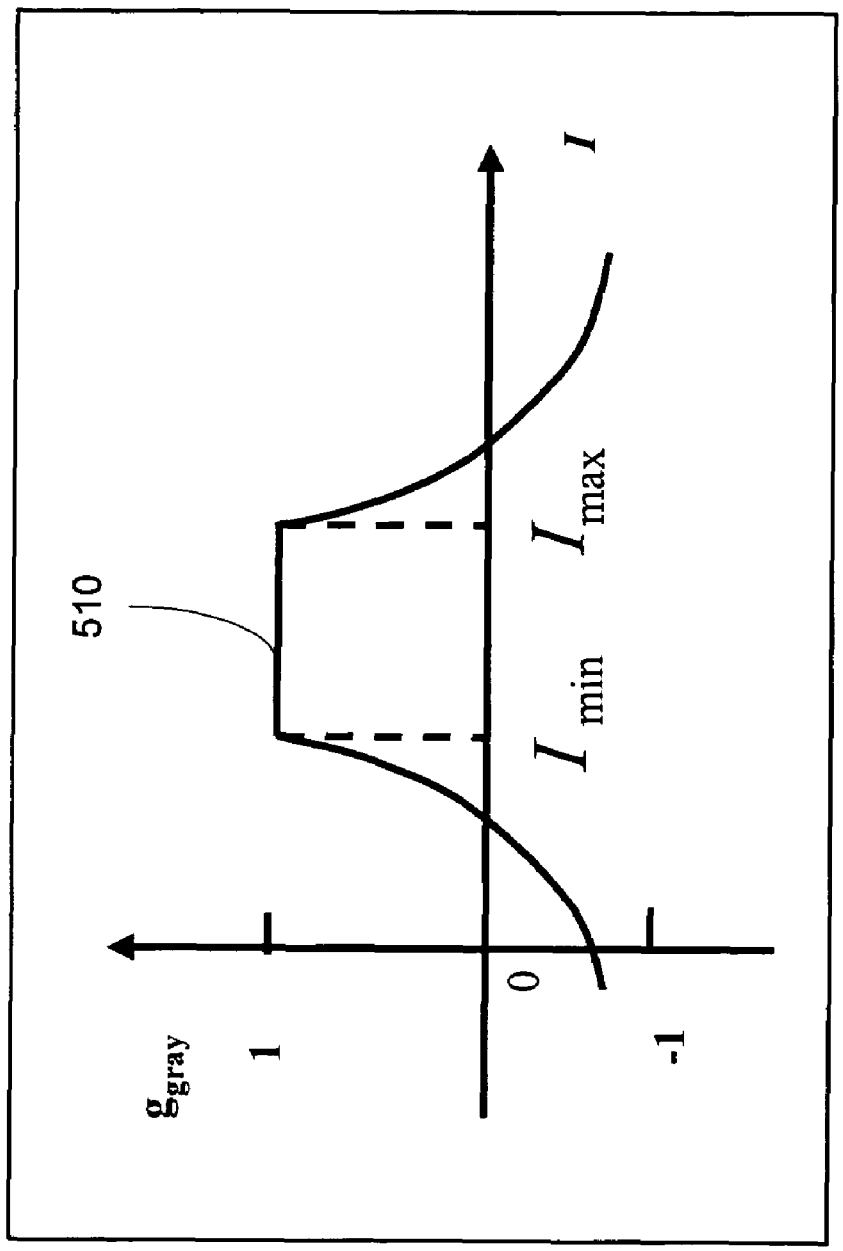
FIG. 5 shows a gray-level component in the base speed function according to one embodiment of the present invention.

A plot of the function $g_{gray}$ 510 is shown in FIG. 5, which implies that the speed function can be negative, thus moving the front backward on certain regions.

The term Sign($g_{base}$) in equation (5) is required because of the front propagation scheme included in the accumulative speed function algorithm. Without the term, one would propagate a negative term when the base speed function is negative. This would lead to a term $g_0$ whose sign would alternate from iteration to iteration. Additionally, the term $g_0$ in equation (5) does not multiply the curvature term $\kappa$.

The method of the present invention has six parameters: $I_{min}$, $I_{max}$, $\alpha$, a coefficient in the gradient exponential term, $\gamma$, a coefficient in the intensity exponential term, and $\epsilon$, a multiplicative term in front of a curvature of a contour. The sixth parameter is a width of the narrow band. These parameters are non-linearly related, which makes their manual selection non-intuitive. In one embodiment, schemes are devised in which the first five coefficients are automatically estimated based on regions of interest (hereinafter "ROI") drawn on structures of interest in an image. In one embodiment, the structures of interest at least partially include an organ to be segmented. The width of the narrowband is a user-selected parameter but it is shown that the invented method is not sensitive to this choice.

First, it is assumed that the gradient and intensity terms in the speed function dominate the curvature term. This is typically true at the beginning of the evolution process when the front is well inside the structure of interest. Furthermore, it is assumed that the regions encircled by the ROIs are representative of the entire object, both in terms of intensity and gradient distributions. Finally, it is assumed that both these features are normally distributed. With $m_{grad}$, $\sigma_{grad}$, $m_{gray}$, $\sigma_{gray}$ being the means and standard deviations of the gradient magnitude and intensity values in the ROI, respectively, $I_{max} = m_{gray} + 2*\sigma_{gray}$ and $I_{min} = m_{gray} - 2*\sigma_{gray}$ are defined.

In one embodiment, the accumulative speed function algorithm is designed to prevent leakage. The front needs to be stopped before it reaches a boundary of a narrow band. This will be the case if $$\sum_{t=0}^{\infty} g_0(x,t) \cdot \Delta t \leq N \qquad (8)$$

with $g_0(x,t)$ the speed at position x where the front is located at time t, $\Delta t$ the time step and N the width of the narrow band. In one embodiment, it is assumed that the front propagates at maximum speed until it reaches a weak boundary, and $t_0$ is set to be the time at which this happens and $g_0(x, t_0)=g$ to be the base speed at this point. Because of the accumulative speed scheme, the value of $g_0$ expressed in terms of k is $g_0=g^k$, with k the number of iterations since $t_0$, where a uniform value for g over the weak edge is assumed. The distance the front travels since $t_0$ is thus $$d=(g+g^2+g^3+\ldots)\cdot \Delta t. \qquad (9)$$

To stop the front exactly at the boundary N of the narrow band, equation (8) becomes $$\sum_{k=1}^{\infty} g^k \cdot \Delta t = N \Leftrightarrow g\left(1+\sum_{k=1}^{\infty} g^k\right) \cdot \Delta t = N \Rightarrow g(1+N/\Delta t) = N/\Delta t. \qquad (10)$$

From equation (10), g is computed as $$g = \frac{N}{N+\Delta t}. \qquad (11)$$

To derive the parameters $\alpha$ and $\gamma$, the intensity and the gradient terms in the speed function are treated independently, which leads to an upper bound for the parameters. First, considering the gradient term $g_{grad}=e^{-\alpha|\nabla G_o * I|}$, and stopping the front over regions where the gradient is greater than $m_{grad}+\sigma_{grad}$, which results to the following equations:

$$e^{-\alpha(m_{grad}+\sigma_{grad})} = \frac{N}{N+\Delta t} \Rightarrow \alpha = \frac{\ln\left(1+\frac{\Delta t}{N}\right)}{m_{grad}+\sigma_{grad}}. \qquad (12)$$

For stopping the front over regions whose gray value less than $I_{min}-\sigma_{gray}$ or greater than $I_{max}+\sigma_{gray}$, the value of $\gamma$ is computed as follows:

$$2e^{-\gamma\sigma_{gray}} - 1 = \frac{N}{N+\Delta t} \Rightarrow \gamma = \frac{\ln\left(1+\frac{\Delta t}{2N+\Delta t}\right)}{\sigma_{gray}}. \qquad (13)$$

Referring to equation (5), the curvature term becomes dominant when the term $|g_0|$ is small, i.e., over regions that are outside the expected range for gradients or intensity values for the structure of interest. This happens either when the front reaches a true boundary or when it passes over regions that are not representative of the structure of interest. In one embodiment of the present invention, the curvature term becomes dominant when the front passes over a blood vessel. Indeed, in the data set according to the embodiment, these vessels have an intensity value that is much higher than liver tissue. Without the curvature term, the speed function leads to a premature immobilization of the front at the interface of large intra-hepatic vessels. To address this problem, the following values for the curvature coefficient $\epsilon$ are employed, which respectively are:

$$\varepsilon = \begin{cases} 0 & \text{when } \kappa > 0 \text{ or } I(x,y) \leq I_{min} - \sigma_{gray} \\ 0.01 & \text{otherwise} \end{cases} \qquad (14)$$

Figure 6:
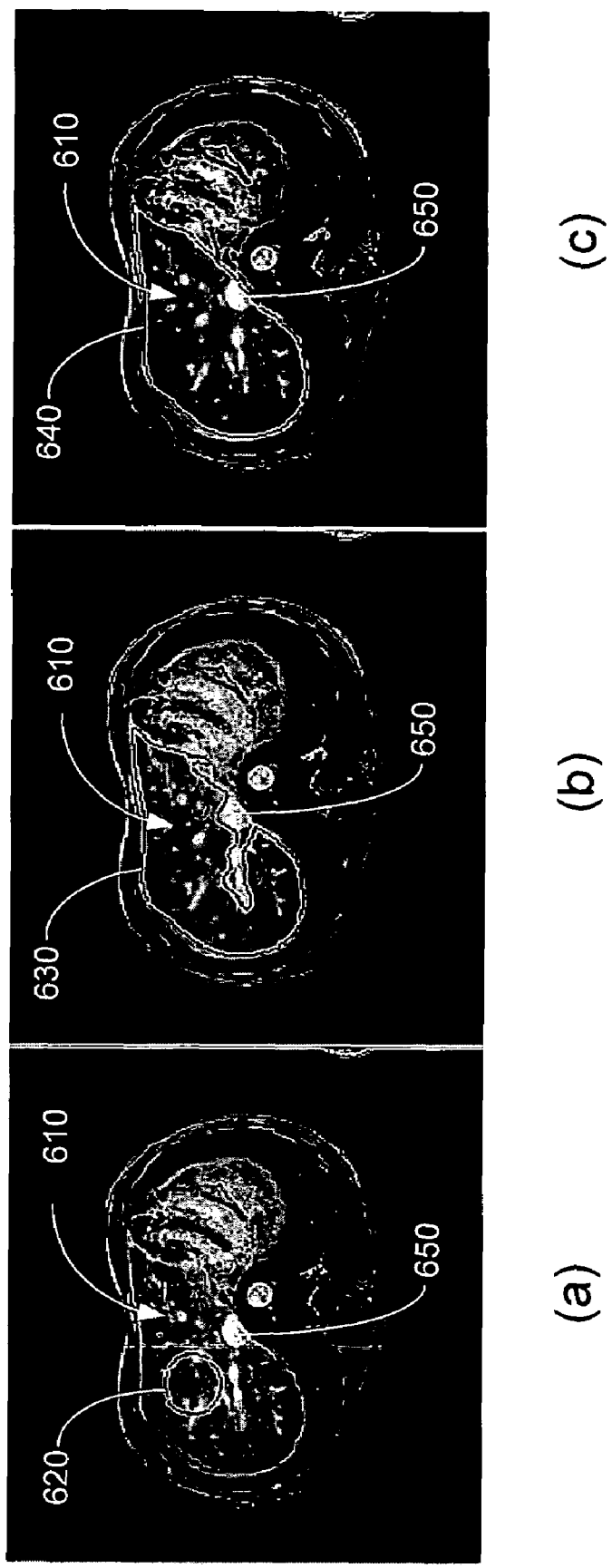
FIG. 6 shows liver segmentations from a MR image: (a) an initial contour, (b) a final contour obtained with a traditional speed function, and (c) a final contour obtained with an accumulative speed function according to one embodiment of the present invention.

Accordingly, the curvature term have no effect when either the curvature of the front is positive or when the front travels over dark regions. It, however, pushes the front forward when the curvature is negative and the front travels over bright regions. The effect of the curvature term is illustrated in FIG. 6. As shown in FIG. 6(a), a contour 620 is initialized inside the structure of interest 610. In the embodiment, the structure of interest 610 corresponds to a human liver. FIG. 6(b) shows the contour 630 obtained with a speed function in which the curvature term is used in a conventional way. Because $g_0$ is small over bright regions and multiplies the curvature term, the contour 630 stops when it reaches a vessel 650. FIG. 6(c) shows the contour 640 obtained on the same image with the speed function according to one embodiment of the present invention. The gradient-dependent and intensity-dependent terms in the speed functions are still small in the vicinity of the vessel 650 and the curvature term becomes predominant. This term forces a reduction in the local curvature of the contour 640 that permits its progression over the vessel 650.

In one embodiment, the method of the present invention further includes the step of localizing an inner boundary of the structures surrounding the organ as a shape constraint for the propagating front of the contour so as to prevent the front from leaking out to the musculature between the structures. In one embodiment, the structures have a set of ribs. The shape constraint is adapted for segmentation of a liver from an image, for example, a CT image, where the contrast between liver parenchyma and surrounding tissues and/or the signal to noise ratio are very low. The shape constraint can also be used for segmentation of other organ, such as a heart, a stomach, a kidney, and a lung.

Figure 7:
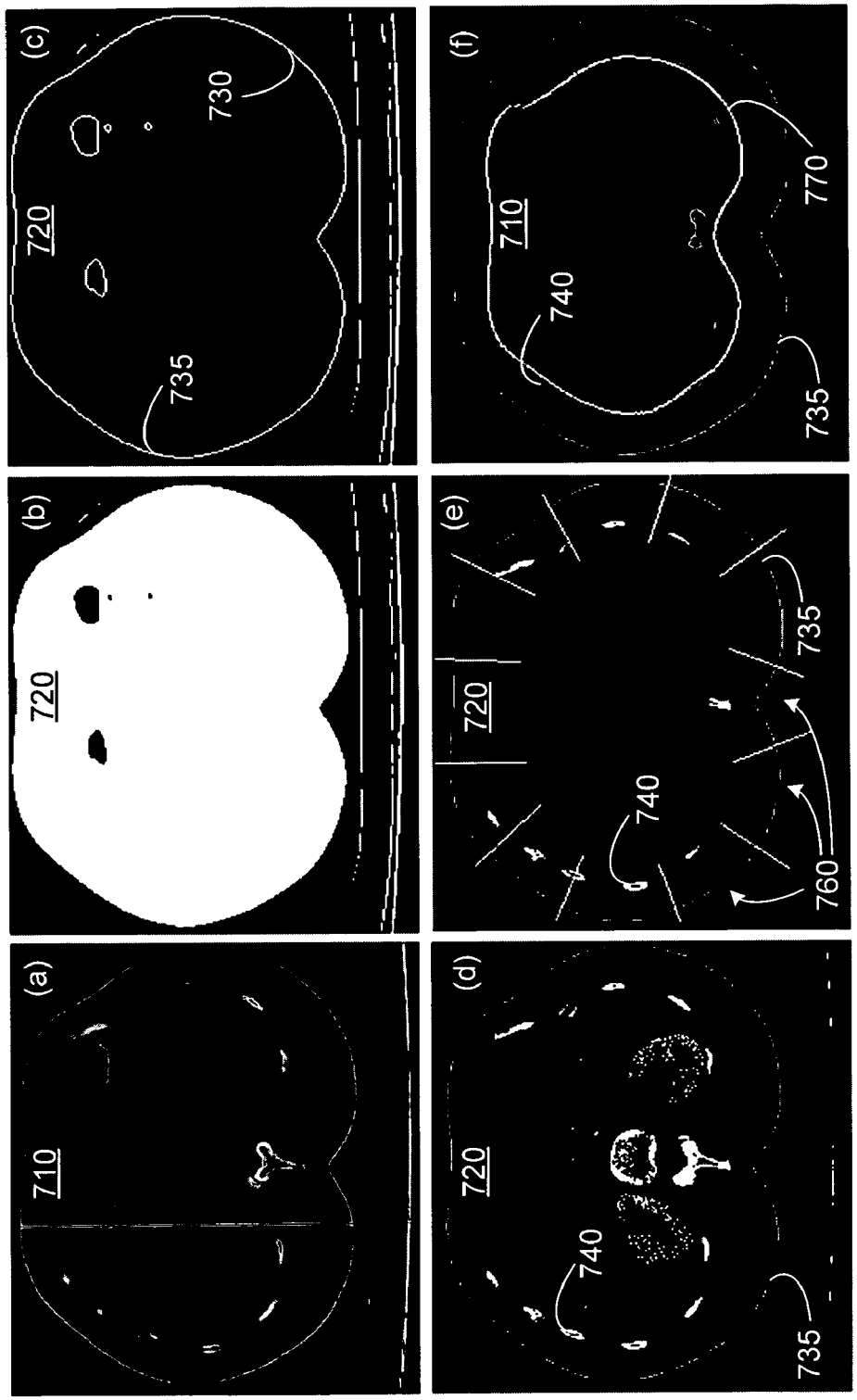
FIG. 7 shows schematically generation of a shape constraint on a CT image of a liver according to one embodiment of the present invention: (a) the CT image, (b) a binary image, (c) a skin surface in the binary image, (d) a set of candidate pixels in the binary image, (e) a skin surface segmentation in the binary image, and (f) a localization of an inner boundary of ribs in the CT image.

Referring to FIG. 7, localization of a shape constraint is illustrated according to one embodiment of the present invention. At first, an image 710 of a human liver as shown in FIG. 7(a) is converted into a binary image 720, as shown in FIG. 7(b). In one embodiment, the conversion of the image 710 is performed with a threshold, $I_{skin}$. Then, a skin surface 730 is localized from the converted binary image 720, where the localized skin surface 730 has a skin circumference 735, as shown in FIG. 7(c). Third, a set of candidate pixels 740, $P_{candidate}=\{P_{candidate}(j)\}$, is identified from the converted binary image 720, where $j=1, 2, \ldots, N_c$, $N_c$ being the number of the set of candidate pixels $P_{candidate}$ 740, as shown in FIG. 7(d). As shown in FIG. 7(e), a set of rib pixels 745, $P_{rib}=\{P_{rib}(i)\}$, is determined from the set of candidate pixels $P_{candidate}$ 740, where each of the set of rib pixels $P_{rib}$ 745 corresponds to one of the set of ribs in the converted binary image 720, and i=1, 2, ..., $N_r$, $N_r$ being the number of the set of rib pixels $P_{rib}$ 745. In one embodiment, the set of rib pixels 745 is expressed as:

$$P_{rib}=\{(x,y)|(x,y)\in P_{candidate}, \text{ and } D_{skin}(x,y)<d_{rib\_max}\}, \quad (15)$$

where $d_{rib\_max}$ is a maximum possible distance from a rib to the skin circumference 735. Then, the set of rib pixels $P_{rib}$ 745 is segmented into a plurality of sections 760, S={S(k)}, along the skin circumference 735 in the converted binary image 720, where k=1, 2, ..., $N_s$, $N_s$ being the number of the plurality of sections 760, as shown in FIG. 7(e). Next, distances of each rib pixel in a segmented section S(k) to its closest skin pixels on the skin circumference in the segmented section S(k) are calculated so as to obtain the mean value $\overline{D}_{skin}(k)$ and the standard deviation $D_{std}(k)$ of these distances in the segmented section S(k), respectively. A skin-rib distance is then defined as $d_{skin\text{-}rib}(k)=\overline{D}_{skin}(k)+2D_{std}(k)$ for the segmented section S(k). Finally, the plurality of segmented sections 760 is connected together to form the inner boundary 770 of the plurality of ribs, $$P_{in}=\{(x,y)|d(x,y)=Td_{skin\text{-}rib}(C\_Map(x,y))\}, \quad (16)$$

where d(x,y) is distance of pixel (x,y) to the skin circumference, C_Map(x,y) is the closest point of pixel (x,y) on the skin circumference, and $Td_{skin\text{-}rib}$ is a lookup table that stores the skin-rib distance $d_{skin\text{-}rib}$ for each pixel along the skin circumference, In one embodiment, the connecting step is performed with an interpolation scheme. FIG. 7(f) shows the detected skin surface 630, ribs and inner rib-liver ring 770 overlaid on top of the original image 710. The inner rib-liver ring 770 localized by the shape constrain algorithm constrains the front of the contour from leaking out to the musculature between the ribs.

In one embodiment, the invented method also includes the step of performing a stiff band algorithm on a propagating front of a contour so as to constrain the front evolution of the contour based on the surrounding environment of the contour. The stiff band algorithm is adapted for segmentation of the liver from an image, where the intensity value and texture pattern may be very similar among, for instance, liver parenchyma, stomach, and other organs so that boundaries of the liver may be ill-defined. The stiff band algorithm combines the advantages of level set and parametric model approaches. The advantage of the parameterized model (marker/string model) is that the geometric properties calculated for markers on the contour are not as local as those computed in the level set approach. They are average values that are not sensitive to local discrete approximation. The marker/string approach also allows one to constrain displacement of a pixel and make it compatible with the displacement of its neighbors. In this approach, it is assumed that a pixel stops when its neighboring pixels stop if these pixels are on the same propagation front even when there is no local obstacle ahead of this pixel.

Figure 8:
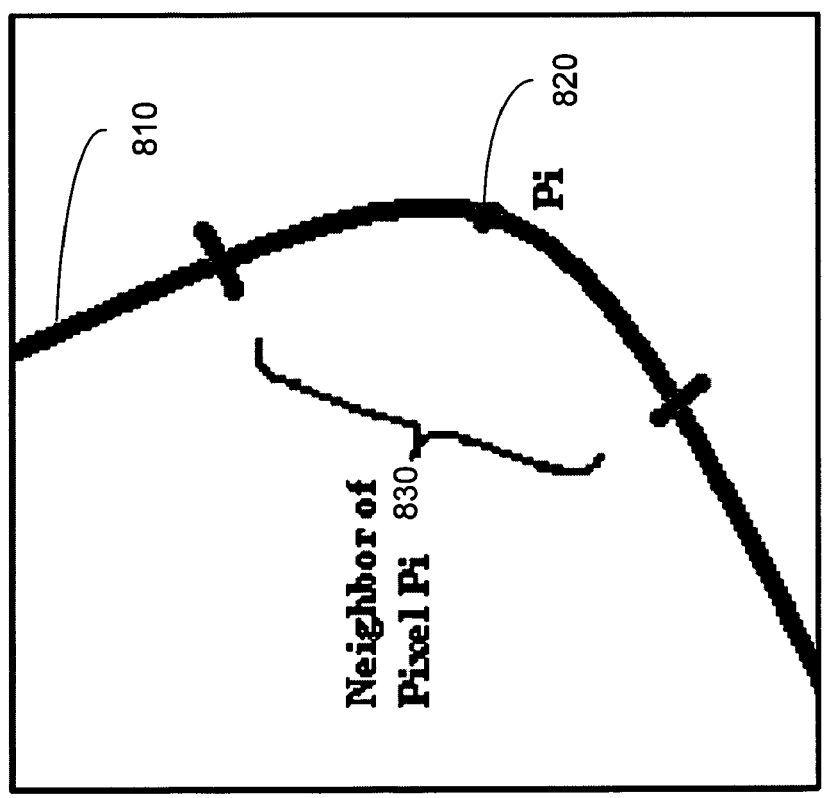
FIG. 8 shows schematically a pixel $P_i$ and its neighborhood on a contour according to one embodiment of the present invention.

In one embodiment, in the performance of the stiff band algorithm, first, a neighborhood 830 is defined for each of pixels {$P_i$} 820 along the contour 810, as shown in FIG. 8, where $P_i$ represents the ith pixel 820 on the contour 810, and i=1, 2, ..., N, N being the number of the pixels. Accordingly, the neighborhood 830 includes a set of pixels that are within ±ϵ pixels, where ϵ is a non-zero positive number. Because contours to be dealt with are closed contours, the neighbors for pixels at the beginning and the end of the contours include pixels in another cycle.

After the neighborhood 830 for pixel $P_i$ 820 is defined, it is divided into a first set of pixels that are in front of pixel $P_i$ 820 along a propagating direction of the contour 810, and a second set of pixels that are behind of pixel $P_i$ 820 along the propagating direction of the contour 810. The pixels of the neighborhood 830 provide information on how pixel $P_i$ 820 may move.

In general, regions in which leakages of a contour front occur are inside the abdomen and are surrounded by regions with well defined edges (boundaries). The segmentation process will face situations where edge segments are separated by gaps. To overcome the problem, a speed limit σ is defined to classify the pixels of the neighborhood into several possible states. For all the pixels in the neighborhood, the subset of pixels that have a speed less or equal to the speed limit σ are identified as the stopped pixels. These pixels are the ones that are close to or on the strong edge segments and could influence the movement of pixel $P_i$. There are three possible scenarios: (i) there are not enough pixels in the neighborhood that have stopped, (ii) there are enough pixels on one side of the neighborhood that have stopped, and (iii) there are enough pixels on both sides that have stopped. For each state, the neighborhood of pixel $P_i$ is segmented. The above processes are iteratively repeated for all pixels {$P_i$}. The three scenarios are detailed below.

Not enough pixels in neighborhood that have stopped. In this scenario, there are either no pixels or not enough pixels in the pixel $P_i$'s neighborhood that have stopped. Nothing needs to be done in this case. The pixel $P_i$'s neighborhood influences the movement of pixel $P_i$ only when they are in the area of obvious strong edge segments. It is important to make sure that a certain amount of pixels in the neighborhood are on the true strong edge segments so that the contour front can skip through noisy spurious regions.

Figure 9:
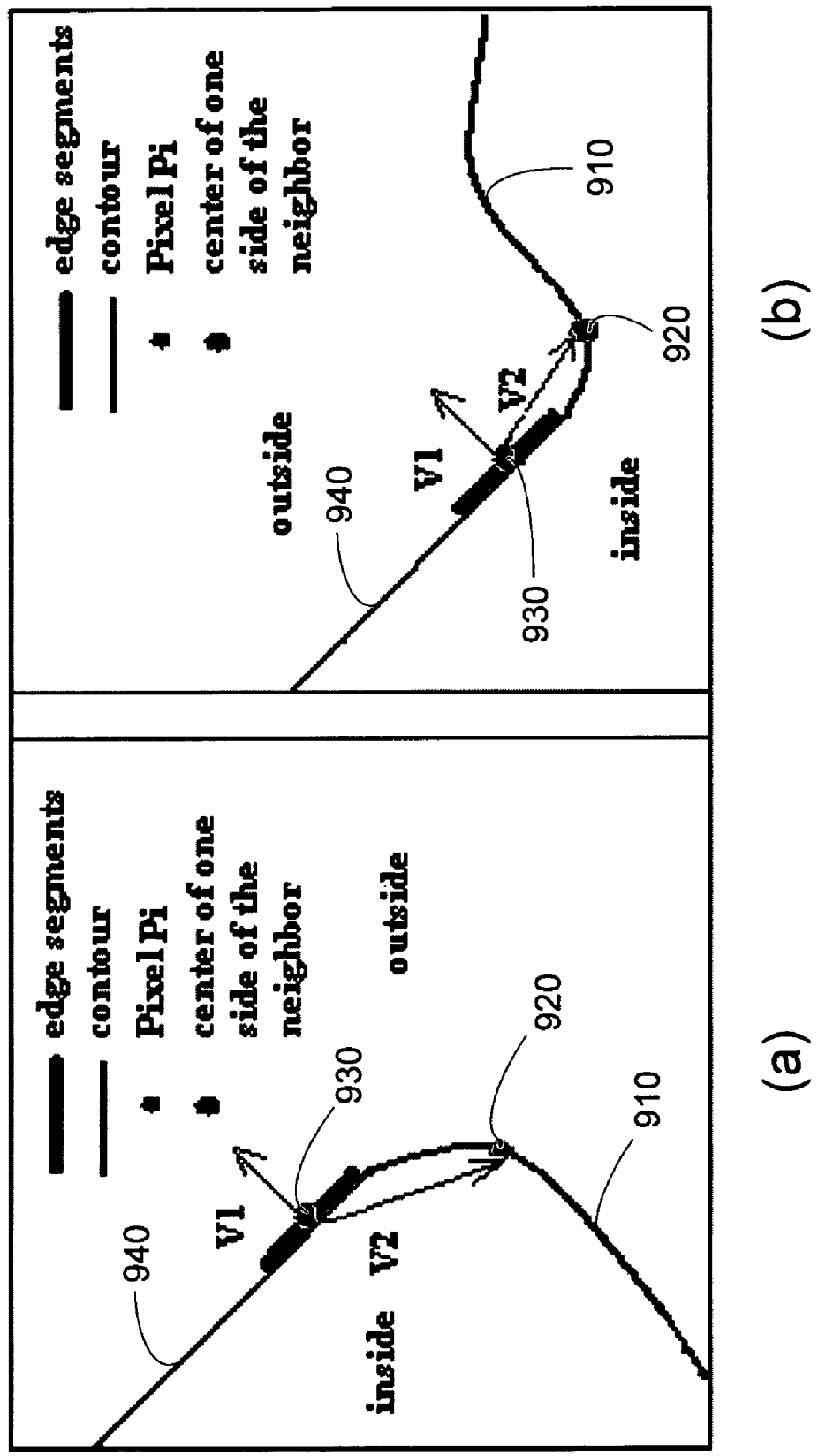
FIG. 9 shows two possible scenarios (a) and (b) for having enough pixels on only one side stopped according to one embodiment of the present invention.

Only one side has enough pixels that have stopped. In this scenario, there are enough pixels on one side of pixel $P_i$'s neighborhood that have stopped. As shown in FIG. 9, there are two possible situations: either pixel $P_i$ 920 has passed its neighbors or it has not, as shown in FIG. 9a and FIG. 9b, respectively. In both situations, two points are defined. One is pixel $P_i$ 920 itself, the other one is the center 930 (mean position) of all the stopped pixels on one side. Additionally, two vectors are defined. V1 is the average normal direction of all the stopped pixels 930. V2 is a vector from the center point to pixel $P_i$ 920.

In each situation, the sign and the magnitude of the speed at pixel $P_i$ 920 are defined. Specifically, the sign of the speed is defined as $S_{sign}=-V1\cdot V2$, a dot product between vector V1 and V2. The magnitude of the speed is defined as $S_{mag}=|S_p|$, where Sp is the accumulative speed of $P_i$ 920. Basically, the definition defines a line 940 that passes through the center point 930 and is perpendicular to vector V1. This line 940 divides the plane into two parts, inside and outside, with V1 pointing toward the outside. In the situation shown in FIG. 9a, pixel $P_i$ 920 is inside and the sign of the speed is positive. Pixel $P_i$ 920 therefore moves outward the line 940 until it is in line with its neighbors. In the situation shown in FIG. 9b, pixel $P_i$ 920 is outside and the sign of the speed is negative. Pixel $P_i$ 920 thus moves inward. In both situations, the movement helps pixel $P_i$ 920 to be inline with the strong edge segment.

Figure 10:
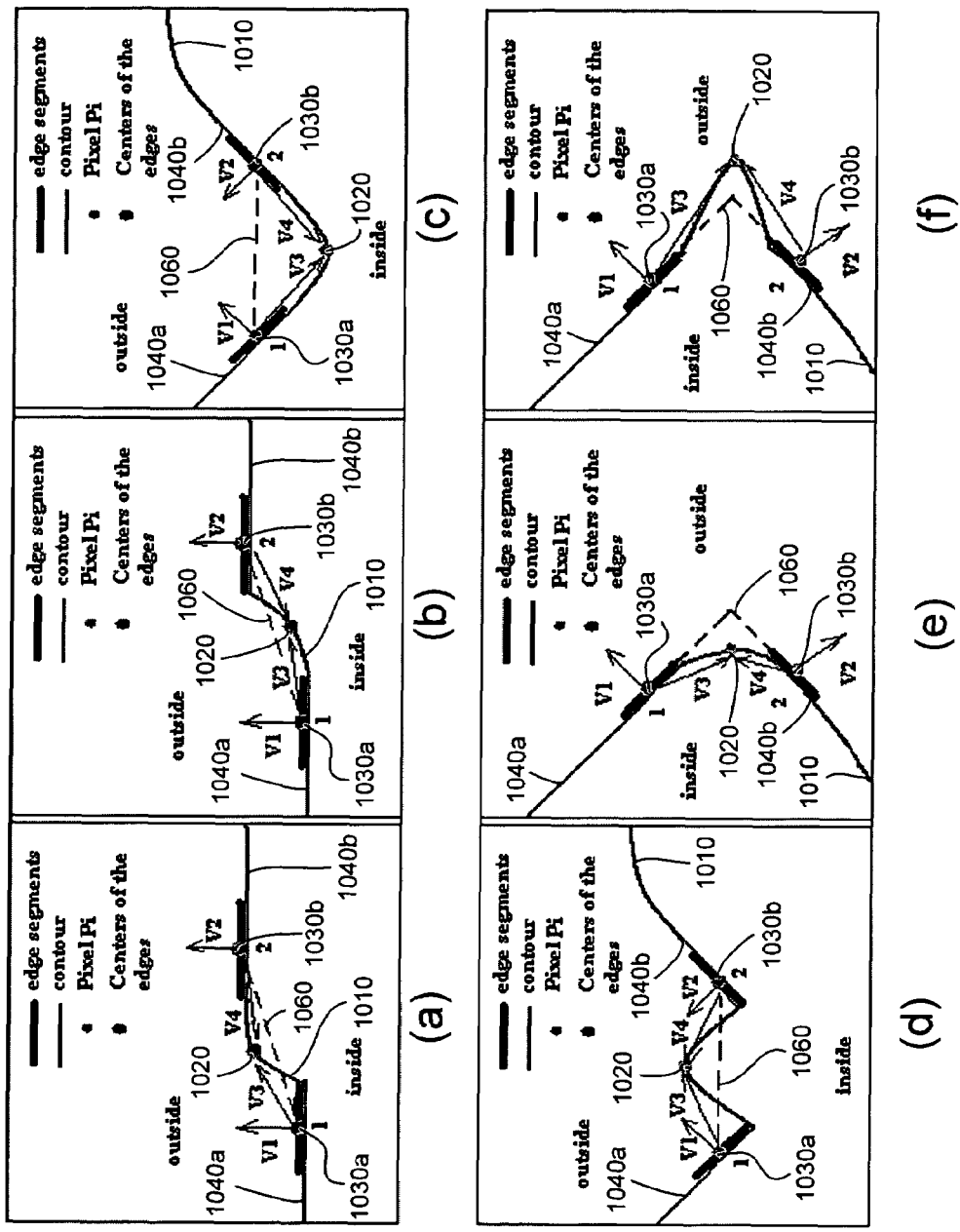
FIG. 10 shows various possible scenarios (a)-(f) for having enough pixels on both sides stopped according to one embodiment of the present invention.

Both sides have enough pixels stopped. In this scenario, there are enough pixels on both sides of pixel $P_i$ that have stopped, which is illustrated in FIG. 10. To constrain pixel $P_i$'s movement, first, a dividing line from each side as defined above is calculated. The center point of one side of the neighbors can be inside or outside the region defined by the dividing line of the other side of the neighbors. Thus the possible situations may be grouped into three categories: one center point is inside and the other is outside, both of the center points are outside, and both of them are inside. FIGS. 10a and 10b show examples of the first category. In this case, center point one 1030a is inside of the dividing line 1040b of center point two 1030b, and center point two 1030b is outside the dividing line 1040a of center point one 1030a. In the embodiment, a virtual line 1060 is calculated that connects center point one 1030a and center point two 1030b. This virtual line 1060 along with the dividing lines 1040a and 1040b of both center points 1030a and 1030b defines an area that separates the inside and the outside of the contour 1010. A speed of pixel $P_i$ 1020 is set to equal to $-|S_p|$ when pixel $P_i$ 1020 is outside the contour 1010, as shown in FIG. 10a, and $|S_p|$ when pixel $P_i$ 1020 is inside the contour 1010, as shown in FIG. 10b. As a result, pixel $P_i$ 1020 is confined to this region and it prevents the front of the contour 1010 from leaking between the gaps of two edge segments.

FIGS. 10c and 10d show examples of the second category. In this case, both center points 1030a and 1030b are in the outside regions. Again, the dividing lines 1040a and 1040b along with the virtual line 1060 between the two center points 1030a and 1030b define the inside and outside regions of the contour 1010. As sown in FIG. 10c, pixel $P_i$ 1020 is inside the virtual line 1060 and the speed of pixel $P_i$ 1020 is defined as $|S_p|$. Pixel $P_i$ 1020 therefore moves outward until it meets the virtual line 1060. As shown in FIG. 10d, pixel $P_i$ 1020 is outside the virtual line 1060. To pull pixel $P_i$ 1020 back, the speed is defined as $-|S_p|$.

FIGS. 10e and 10f show examples of the third category. In this case, both center points 1030a and 1030b are in the inside regions. Two dividing lines 1040a and 1040b are used to define the area that separates inside and outside of the contour 1010. When pixel $P_i$ 1020 is inside, as shown in FIG. 10e, the speed is defined as $|S_p|$. When pixel $P_i$ 1020 is outside, as shown in FIG. 10f, the speed is defined as $-|S_p|$.

In all the cases, a virtual boundary 1060 is defined based on pixel $P_i$'s neighborhood points, which are on the strong edges. The speed of pixel $P_i$ 1020 is then defined based on the relationship between pixel $P_i$'s position and the virtual boundaries 1060. These speed definitions limit the front of the contour 1010 within the confined area and thus prevent leakage from the gaps between strong edge segments.

In another aspect, the present invention relates to software stored on a computer readable medium for causing a computing system to perform functions that segment a region of interest of an organ in an image. In one embodiment, the functions includes (a) initializing a contour inside the organ in the image, (b) introducing a speed function that is capable of accumulating spatial and temporal information of a propagating front of the contour, where the speed function has a term, $g_0$, (c) defining an image-dependent static term, $g_{base}$, (d) setting the term $g_0 = g_{base}$, (e) computing $\{(x,y,z)|\Phi(x,y,z)=0\}$ at iteration n, so as to obtain a set of points in the zero level set of the embedding function $\Phi$, where n=1, 2, 3, . . . , and coordinates (x, y, z) represent a point on the propagating front of the contour, (f) retrieving the static term $g_{base}(x, y, z)$ for each of the set of points in the zero level set of the embedding function $\Phi$, (g) extending the retrieved static term $g_{base}(x, y, z)$ to a narrow band in which the embedding function $\Phi$ is computed so as to generate an extended term $g_{ext}$, (h) updating the term $g_0 = g_0 g_{ext}$ so as to update the speed function, (i) computing the embedding function $\Phi$ at iteration (n+1) using the updated speed function, and (j) iteratively repeating steps (e)-(i) for a predetermined number of iterations or until the propagating front of the contour does not move. The front of the contour corresponds to the boundary of the region of interest of an organ. In one embodiment, the functions further comprise localizing an inner boundary of structures surrounding the organ as a shape constraint for the propagating front of the contour, and performing a stiff band algorithm on the propagating front of the contour.

In yet another aspect, the present invention relates to a system for performing functions that segment a region of interest of an organ of a living subject in an image. In one embodiment, the system includes a controller that performs the above functions for segmentation of an organ of a living subject with a variable shape and boundary and surrounded by structures and tissues in connection with an image containing the organ.

These and other aspects of the present invention are further described below.

Comparison Between the Invented Method and Region Based Deformable Models

By design, the accumulative speed function method of the present invention produces better results than traditional gradient-based techniques. To compare it with other region-based deformable methods, three representative algorithms for the region-based deformable models were implemented: (i) the active contour model without edge proposed by Chan and Vese [19, 25], (ii) the coupled curve evolution method proposed by Yezzi, Tsai and Willsky [20], and (iii) the geodesic active regions method proposed by Paragios and Deriche [18]. Hereinafter, these methods were referred as CV, YTW and PD, respectively. Briefly, the CV method used an energy function that minimizes the total variance of intensities inside and outside the evolving curve. It was regularized with a term that constrains the length of the contour. The YTW method came in two versions: without constraints and with constraints. In both cases, the energy function was formulated in such a way that the final curves separate statistics (mean, standard deviation) computed in the regions inside and outside the curves as much as possible. The constrained version prevented the values of the statistics from moving in the same direction even though the difference between them increases. The PD method was a hybrid method that involved in a functional with both an intensity and a gradient term. The method relied on the evolution of N curves (with N the number of classes in the image), which were coupled through a constraint that penalizes region overlap and unclassified regions. The main information required by the algorithm was the distribution of intensities within each region, which was accomplished by fitting Gaussians to the image histogram [18]. Parameters for these Gaussians were estimated with a standard EM algorithm.

Figure 11A:
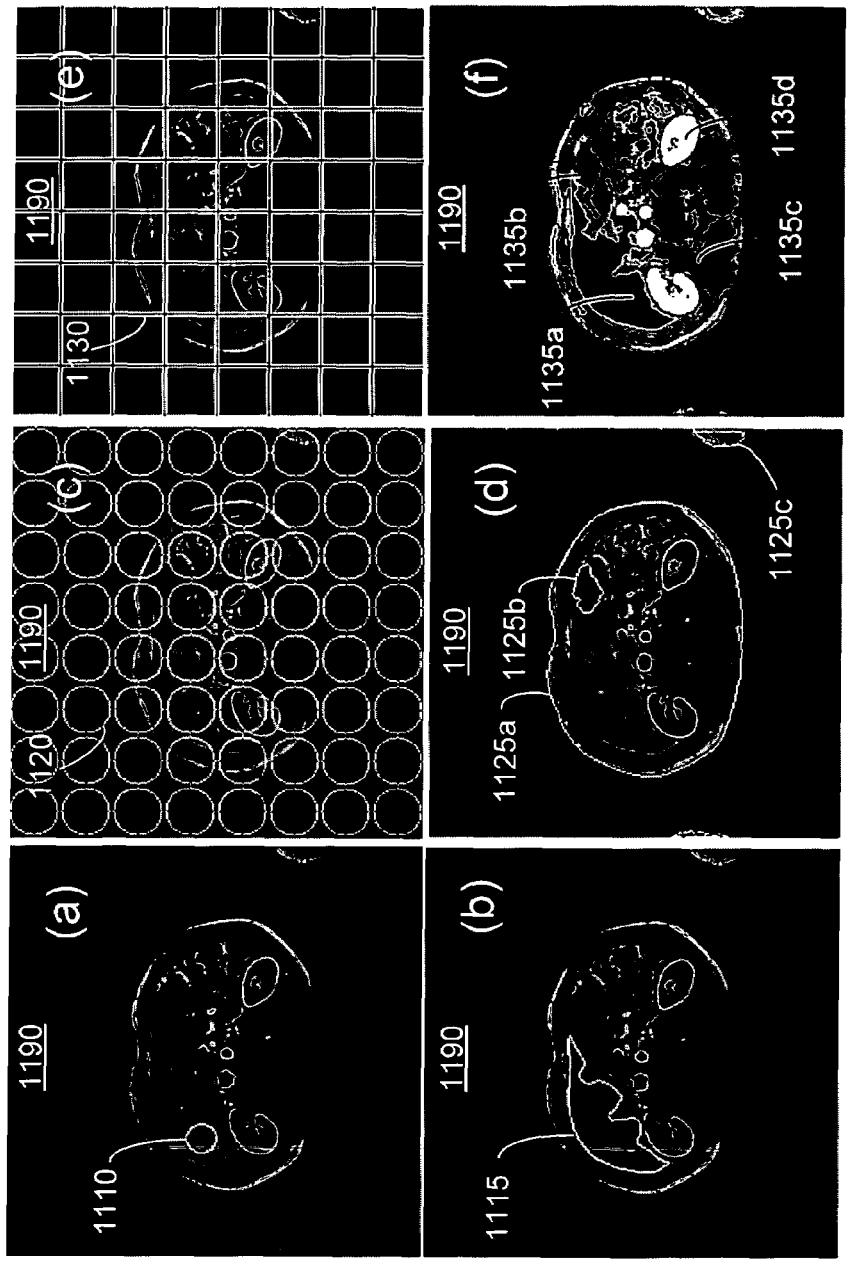
FIGS. 11(A) and 11(B) show liver segmentations with different methods, respectively: A: (a) and (b) the invented method, (c) and (d) the CV method, (e) and (f) the PD method, (g) and (h), the YTW method, (i) and (j), the CV method with one initial contour inside the liver, and (k) and (l), the YTW method with one initial contour inside the liver.
Figure 11B:
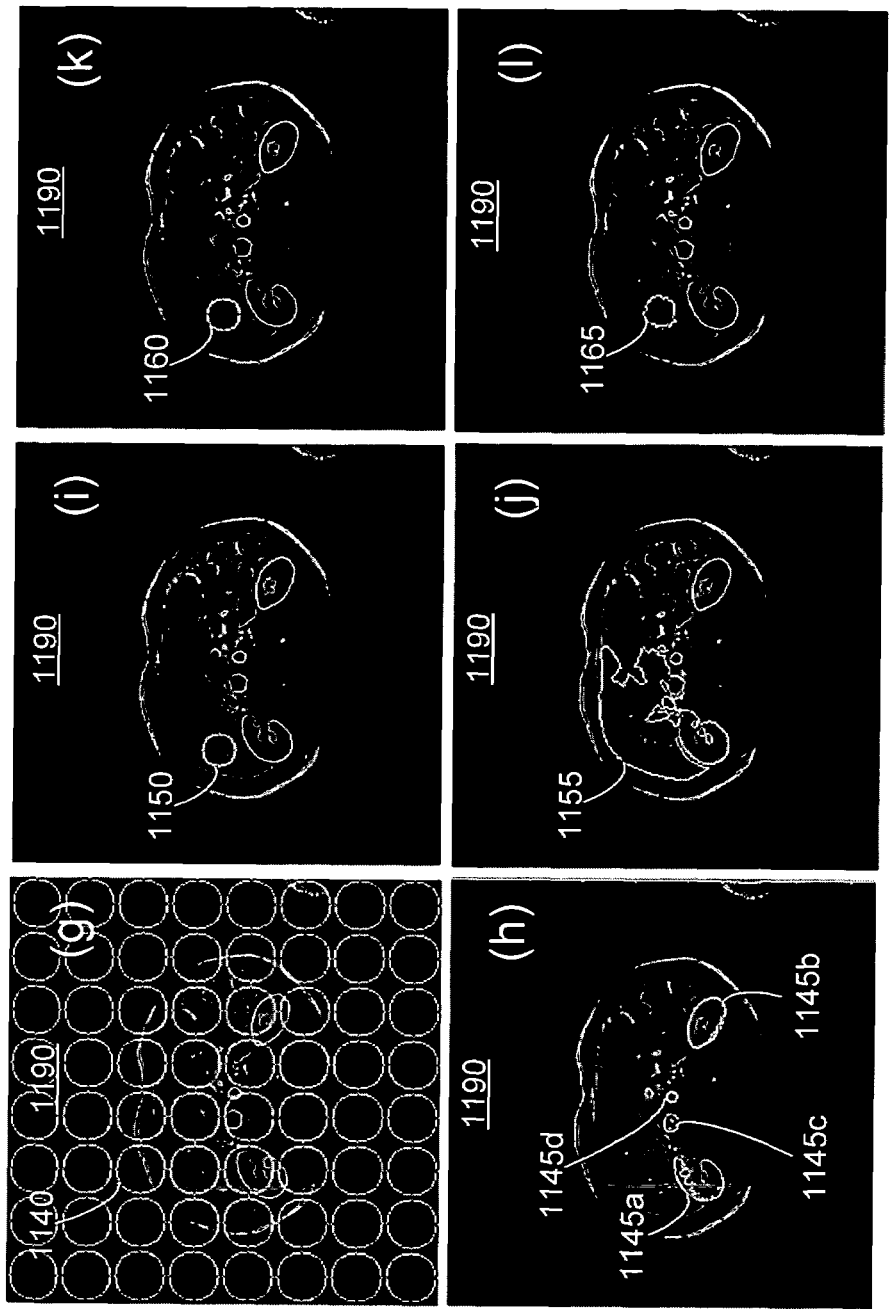

Referring to FIGS. 11(A) and 11(B), segmentation results obtained from an image 1190 with the CV method, the YTW method, the PD method, and the invented method of the current application are shown, respectively. According to one embodiment of the present invention, a contour 1110 was initially placed inside a structure of interest in the image 1190, as shown in FIG. 11a. The contour 1110 evolved with an accumulative speed function model, and stopped at a true boundary 1115 of the structure of interest, as shown in FIG. 11b. For the CV, YTW and PD methods, however, they were typically initialized by placing a number of closed curves that cover the image. These curves then evolved toward final contours. For example, FIGS. 11c and 11d showed the segmentations obtained with the CV method, where a number of circles 1120 were initially placed in the image 1190, and contours 1125a, 1125b and 1125c represented the resultant segmentations. The CV method led to two regions: the background and the foreground. Although it might be extended to more than two classes but the extension still suffers from the same limitations. The PD method was initialized with 4 classes and the result image was intensity-coded with each gray-level values corresponding to one class, which were indicated by 1135a, 1135b 1135c and 1135d, respectively, in FIG. 11f. The PD method might be used for an arbitrary number of classes but the means and standard deviations have to be estimated from the histogram. The YTW method also led to 2 regions: one contained low intensity pixels, the other high intensity pixels, as shown in FIGS. 11g and 11h. The YTW method might not be extended to more than two classes for gray-level images.

The reason why these region-based techniques did not produce satisfactory results on the images was simple. The region-based methods required a good separation of features, such as intensity, texture, etc., between regions. When the features could not be well separated, contours would encompass more than one region, as shown in FIGS. 11c-11h. The intensity value of liver tissues was similar to the intensity value of surrounding structures or of other structures in the image and it cannot be isolated.

FIGS. 11i-11j show the segmentation results obtained with the CV and YTW methods, which were respectively initialized with only one contour 1150 and 1160 that was same as contour 1110 in FIG. 11a. The CV and YTW methods generate a final contour 1155 and 1165, respectively. It is obvious that neither of these methods led to acceptable results.

Liver Segmentation from MR Image Volumes

The accumulative speed function segmentation algorithm according to one embodiment of the present invention was tested on four liver MR image volumes and quantitative results were obtained by comparing automatic with manual contours. Abdominal images of four living donors for liver transplantation were acquired on a 1.5T whole-body MR scanner (Gyroscan NT Intera T15; Philips Medical Systems, Best, The Netherlands). A contrast-enhanced T1-weighted fast field echo sequence was used. Acquisition parameters were: FOV=400*320 mm, acquisition matrix=304*194, reconstruction matrix=512*512, slice thickness=7 mm, slice gap=3 mm, TR=135 ms, TE=2.9 ms, flip angle=60°, NSA=1, acquisition time=14 s per dynamic. Twenty slices were acquired to cover the whole liver. The echo time was chosen to create a phase cancellation between fat and water signals. This created a black outline at the border of the liver, where the voxels contained both liver tissue and peritoneal fat. This effect was beneficial for the segmentation. Gadodiamide (Omniscan, Amersham Health, Cork, Ireland) was used as a contrast agent. Four dynamics were acquired: precontrast, arterial phase, portal phase and delayed phase. Only the delayed phase, where the contrast with the surrounding organs was the most important, was used for the segmentation. Manual delineation of the liver volume was performed independently by L.H., a practitioner.

Because the only user-dependent parameter in the invented algorithm was the selection of the initial ROI and the width of the narrow band, the sensitivity of the results to these parameters was evaluated. For each slice, ten original contour-splaced randomly within the liver were used as initial contours. These contours were generated as follows: first, a distance map from the manual contours was computed for each slice. Then, for each slice, 10 points among all the points that were within the contours and at least 15 pixels away from the contours were selected if such points could be found. If no point could be found that satisfies this condition, which, for example, would be the case when the cross section of the liver seen in the image was small, 10 points that had a distance value greater or equal to $d_{max}-1$, where $d_{max}$ was the maximum distance found inside the manual contours were selected. Each of these points was then used as the center of a circle that served as initial contour. For points located 15 pixels away from the manual contour, a radius of 15 pixels was selected. For others, a radius of $d_{max}-1$ was used. In each case, the number of iterations was fixed to 500. Manual and automatic contours were then compared using both a similarity index and a distance measure. The similarity index was defined as $$S = \frac{2N(C_1 \cap C_2)}{N(C_1) + N(C_2)}, \qquad (17)$$

with N(C) the number of pixels within a contour, and $C_1$ and $C_2$ the manual and automatic contours, respectively. The value of this index varies between 0 and 1. In general, values of 0.8 or above indicate very good agreement between the manual and automatic contours. The distance measure was the average distance from one automatic contour to the closest point on the corresponding manual contour. In each case, the similarity measures were computed on each slice, and then averaged across slices.

TABLE 1

Values of the similarity index for 10 trials with randomly selected initial contours and three different narrow band widths.

| Narrow Band Width (pixel) | Similarity Index | | | | | | | | | | | |
|---|---|---|---|---|---|---|---|---|---|---|---|---|
| Random | Subject 1 | | | Subject 2 | | | Subject 3 | | | Subject 4 | | |
| Trial | 3 | 5 | 7 | 3 | 5 | 7 | 3 | 5 | 7 | 3 | 5 | 7 |
| 1 | 0.94 | 0.94 | 0.95 | 0.92 | 0.91 | 0.94 | 0.93 | 0.94 | 0.95 | 0.93 | 0.93 | 0.93 |
| 2 | 0.91 | 0.91 | 0.91 | 0.91 | 0.92 | 0.93 | 0.93 | 0.94 | 0.95 | 0.92 | 0.92 | 0.93 |
| 3 | 0.93 | 0.93 | 0.95 | 0.92 | 0.92 | 0.93 | 0.93 | 0.94 | 0.95 | 0.93 | 0.93 | 0.93 |
| 4 | 0.94 | 0.95 | 0.95 | 0.92 | 0.91 | 0.94 | 0.93 | 0.94 | 0.95 | 0.92 | 0.92 | 0.93 |
| 5 | 0.92 | 0.92 | 0.95 | 0.92 | 0.92 | 0.94 | 0.93 | 0.94 | 0.95 | 0.92 | 0.93 | 0.93 |
| 6 | 0.93 | 0.93 | 0.95 | 0.91 | 0.92 | 0.94 | 0.93 | 0.94 | 0.95 | 0.93 | 0.92 | 0.93 |
| 7 | 0.94 | 0.95 | 0.95 | 0.91 | 0.91 | 0.93 | 0.94 | 0.94 | 0.95 | 0.92 | 0.92 | 0.92 |
| 8 | 0.93 | 0.94 | 0.95 | 0.92 | 0.91 | 0.92 | 0.93 | 0.94 | 0.95 | 0.91 | 0.91 | 0.93 |
| 9 | 0.93 | 0.94 | 0.95 | 0.92 | 0.92 | 0.94 | 0.93 | 0.93 | 0.95 | 0.92 | 0.92 | 0.93 |
| 10 | 0.93 | 0.93 | 0.92 | 0.92 | 0.92 | 0.93 | 0.93 | 0.94 | 0.95 | 0.92 | 0.93 | 0.93 |
| Average | 0.93 | 0.93 | 0.94 | 0.92 | 0.91 | 0.93 | 0.93 | 0.94 | 0.95 | 0.92 | 0.92 | 0.93 |
| STD | 0.01 | 0.01 | 0.01 | 0.00 | 0.00 | 0.01 | 0.00 | 0.00 | 0.00 | 0.01 | 0.01 | 0.00 |

The calculation of the parameters in the accumulative speed algorithm was tied to the width of the narrow band. In order to study the sensitivity of the narrow band width, the algorithm was performed with the narrow band width of 3, 5 and 7, respectively. Tables 1 and 2 showed results obtained on the four liver MR image volumes, which were indicated by Subject 1, Subject 2, Subject 3 and Subject 4, respectively. As shown in Table 1, a minimum value of average similarity indices for Subjects 1-4 with different narrow band widths was 0.91. This implied there was a very good agreement between manual and automatic contours. The results shown in Tables 1 and 2 also indicated that the insensitivity of the invented algorithm to the placement of the contours and the narrow band width were shown.

TABLE 2

Average distance between manual and automatic contours for 10 trials with randomly selected original contours and three different narrow band sizes.

| Narrow Band Width (pixel) | Mean Distance (pixel) | | | | | | | | | | | |
|---|---|---|---|---|---|---|---|---|---|---|---|---|
| Random | Subject 1 | | | Subject 2 | | | Subject 3 | | | Subject 4 | | |
| Trial | 3 | 5 | 7 | 3 | 5 | 7 | 3 | 5 | 7 | 3 | 5 | 7 |
| 1 | 1.59 | 1.71 | 1.62 | 1.84 | 1.92 | 1.30 | 1.27 | 1.22 | 1.15 | 2.20 | 1.82 | 2.54 |
| 2 | 3.15 | 3.93 | 4.26 | 1.66 | 1.65 | 1.41 | 1.28 | 1.14 | 1.09 | 2.48 | 2.57 | 2.45 |
| 3 | 1.77 | 2.07 | 1.44 | 1.78 | 1.77 | 2.31 | 1.32 | 1.19 | 1.08 | 1.58 | 1.91 | 2.44 |
| 4 | 1.87 | 1.67 | 1.94 | 1.70 | 1.93 | 1.24 | 1.28 | 1.26 | 1.24 | 1.90 | 2.09 | 2.54 |
| 5 | 2.43 | 2.66 | 1.74 | 1.82 | 1.86 | 1.44 | 1.38 | 1.18 | 1.03 | 1.88 | 1.94 | 3.33 |
| 6 | 2.13 | 2.14 | 1.64 | 1.93 | 1.88 | 1.36 | 1.28 | 1.13 | 1.17 | 2.23 | 2.40 | 2.69 |
| 7 | 1.51 | 1.45 | 1.62 | 2.74 | 1.91 | 1.60 | 1.20 | 1.09 | 1.26 | 2.19 | 1.91 | 3.48 |
| 8 | 1.88 | 1.75 | 1.69 | 1.76 | 1.80 | 2.34 | 1.27 | 1.15 | 1.07 | 1.91 | 1.95 | 2.75 |
| 9 | 2.15 | 1.89 | 1.86 | 1.59 | 1.71 | 1.41 | 1.33 | 1.44 | 1.10 | 2.47 | 2.63 | 2.44 |
| 10 | 1.95 | 2.07 | 4.83 | 1.65 | 1.65 | 2.23 | 1.38 | 1.27 | 1.18 | 1.80 | 1.84 | 2.64 |
| Average | 2.04 | 2.13 | 2.26 | 1.85 | 1.81 | 1.66 | 1.30 | 1.21 | 1.14 | 2.06 | 2.10 | 2.73 |
| STD | 0.47 | 0.71 | 1.22 | 0.33 | 0.11 | 0.44 | 0.05 | 0.10 | 0.08 | 0.30 | 0.31 | 0.37 |

Figure 12:
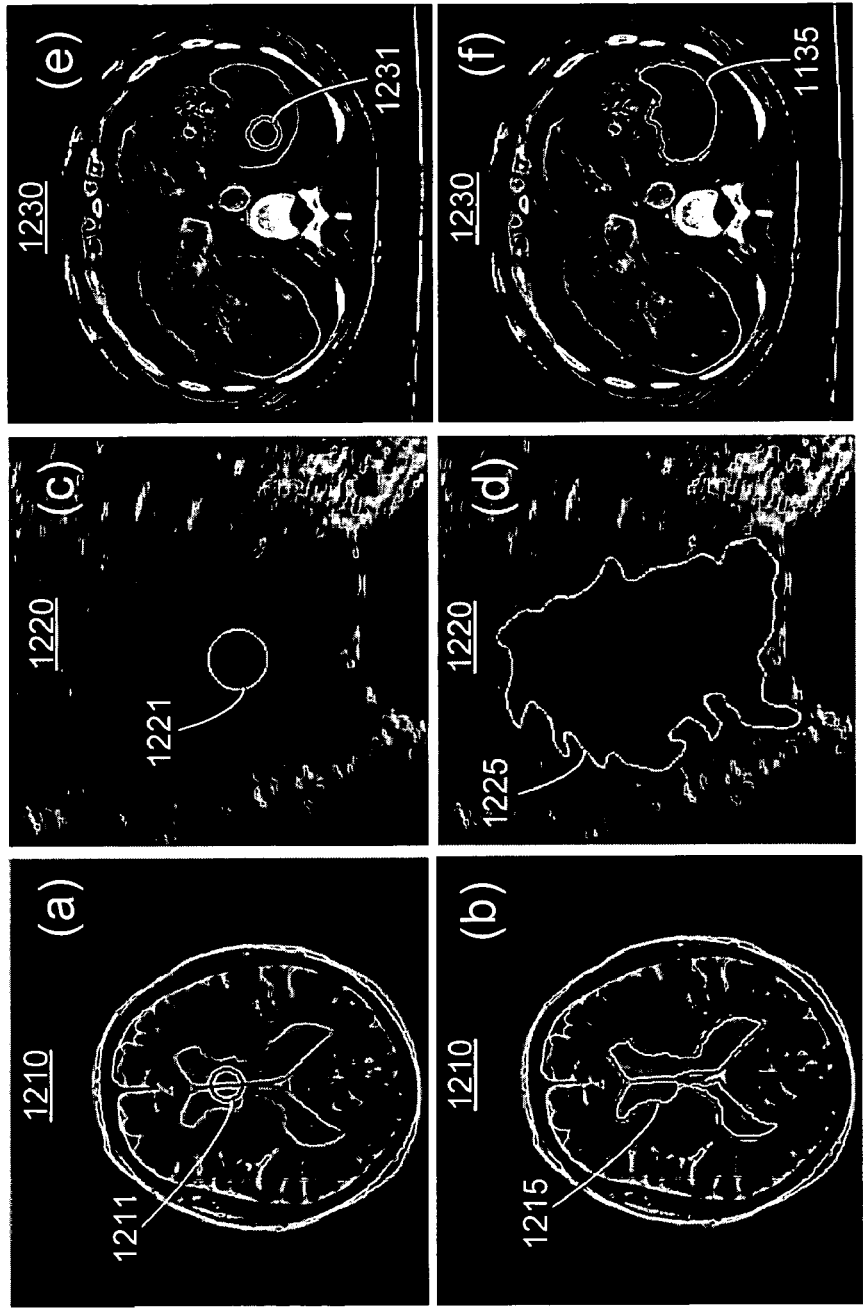
FIG. 12 shows segmentations for various organs (a)-(c) according to one embodiment of the present invention.

The accumulative speed function algorithm can also be employed to segment other organs (objects) such as a lung, a heart, a kidney, a stomach, etc. FIG. 12 shows a few examples for which the invented method(s) had been used to segment different organs with different boundaries, where contours 1211, 1221 and 1231 were initial contours placed inside structures of interest in images 1210, 1220 and 1230, respectively, and contours 1215, 1225 and 1235 were the corresponding boundaries of the structures of interest, respectively.

Liver Segmentation from CT Image Volumes

Figure 13:
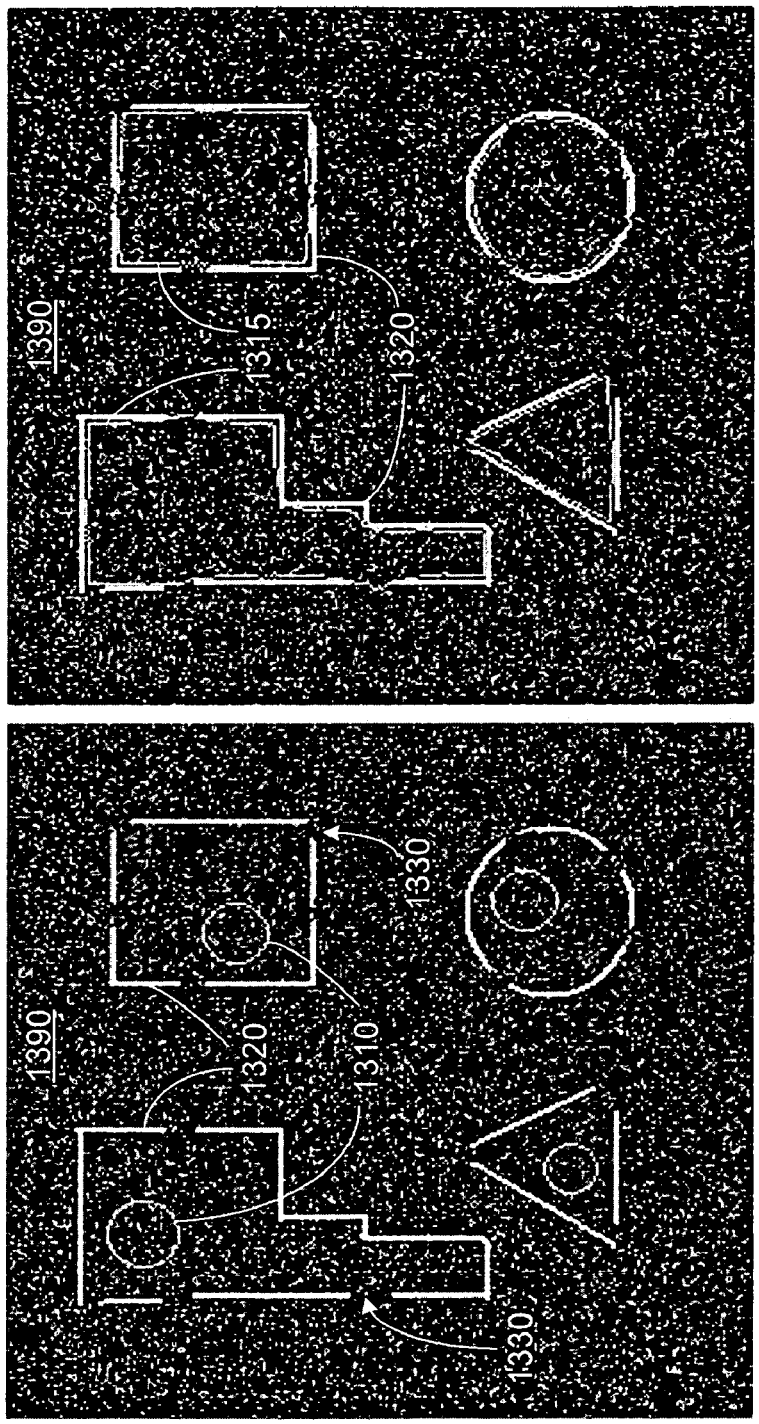
FIG. 13 shows segmentations of synthetic shapes with noisy background according to one embodiment of the present invention.

First, the accumulative speed function algorithm in conjunction with a shape constraint and/or a stiff band algorithm was performed on synthetic image shapes. As shown in FIG. 13a, initial circles 1310 were placed inside various shapes 1320 with noise in a synthetic image 1390. All the shapes 1320 in the image 1390 were incomplete, and various gaps 1330 separated the shapes 1320 into edge segments. The final positions (contours) 1315 of the initial circles 1310 were shown in FIG. 13b, which clearly indicated the segmentation algorithm delineate the shapes 1320 correctly. Instead of leaking out from those gaps 1330, the contour 1315 held the strong edge segments together.

Figure 14:
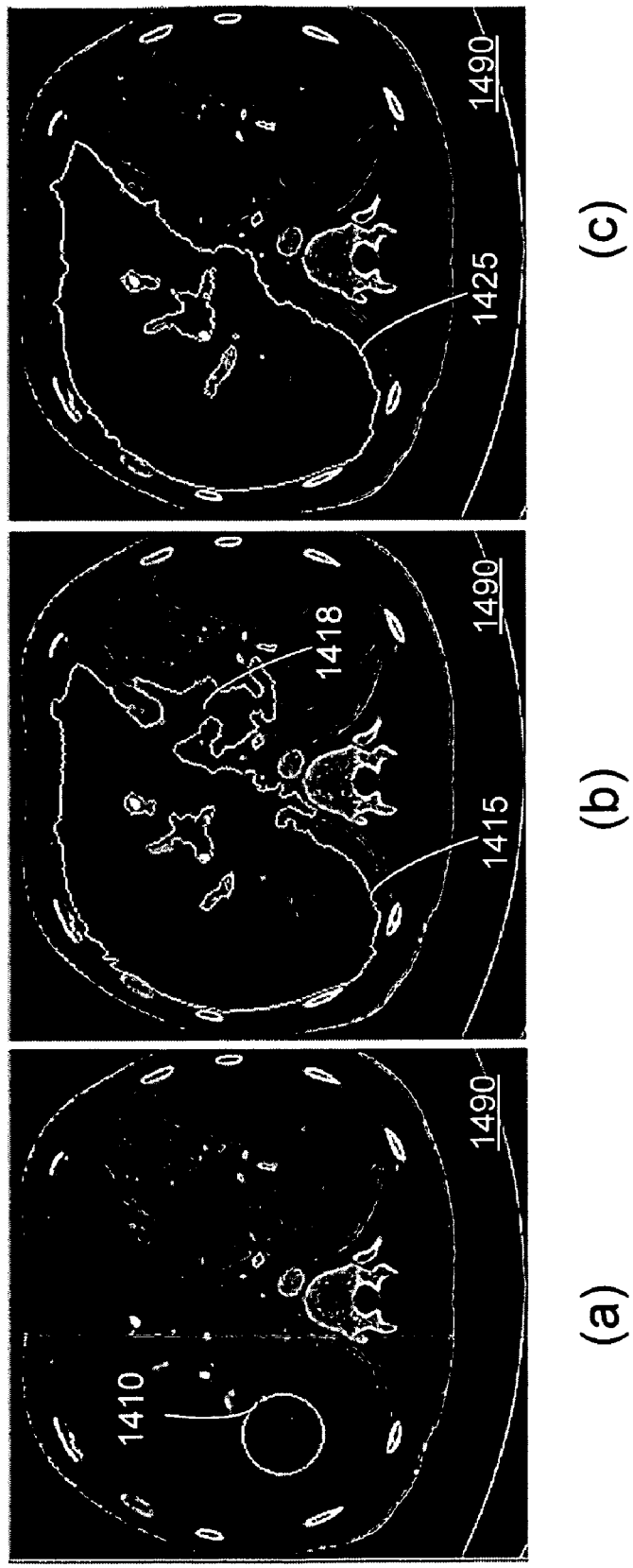
FIG. 14 shows liver segmentations from a CT image with 500 iterations: (a) an initial contour, (b) a final contour obtained with an accumulative speed function according to one embodiment of the present invention, and (c) a final contour obtained with the accumulative speed function in conjunction with a shape constraint and a stiff band algorithm according to another embodiment of the present invention.

Referring to FIG. 14, the accumulative speed function algorithm was performed on a real, noisy CT image 1490. As shown in FIG. 14a, an initial contour 1410 was placed inside a structure of interest (a liver) in the noisy CT image 1490. FIG. 14b showed the segmentation result 1415 by the accumulative speed method after 500 iterations, where the contour 1415 leaked out to surrounding structures 1418 where no boundaries existed. The segmentation result 1425 by the accumulative speed method in conjunction with the shape constraint and the stiff band algorithm after 500 iterations was shown in FIG. 14c, where no leakage out to those areas was obtained.

In one embodiment, the accumulative speed function algorithm in conjunction with the shape constraint and the stiff band algorithm was performed on six liver CT image volumes for quantitative evaluations of the algorithm. The 6 liver CT image volumes had slice thickness ranging from 1 mm to 2 mm. The number of slices for each volume ranged from 123 to 316 slices with an average of 196 slices. For each image volume, initial contours were placed on each slice manually and the segmentation was then conducted semi-automatically. Before comparison to the manual contours, the automatically generated contours were smoothed by using a moving average window on both the x and y coordinates. The final contours were then compared to the manual contours delineated independently by P.B., a practitioner.

In one embodiment, two indices were evaluated for quantifying the quality of the segmentation results. The first index was a similarity index, as defined by equation (17). The other was a mean/median distance measure. This distance measure was the average and median distance from one automatic contour to the closest point on the corresponding manual contour. In each case, the distance was computed on each slice, and then averaged across slices. The distribution of the distance was also calculated.

Figure 15:
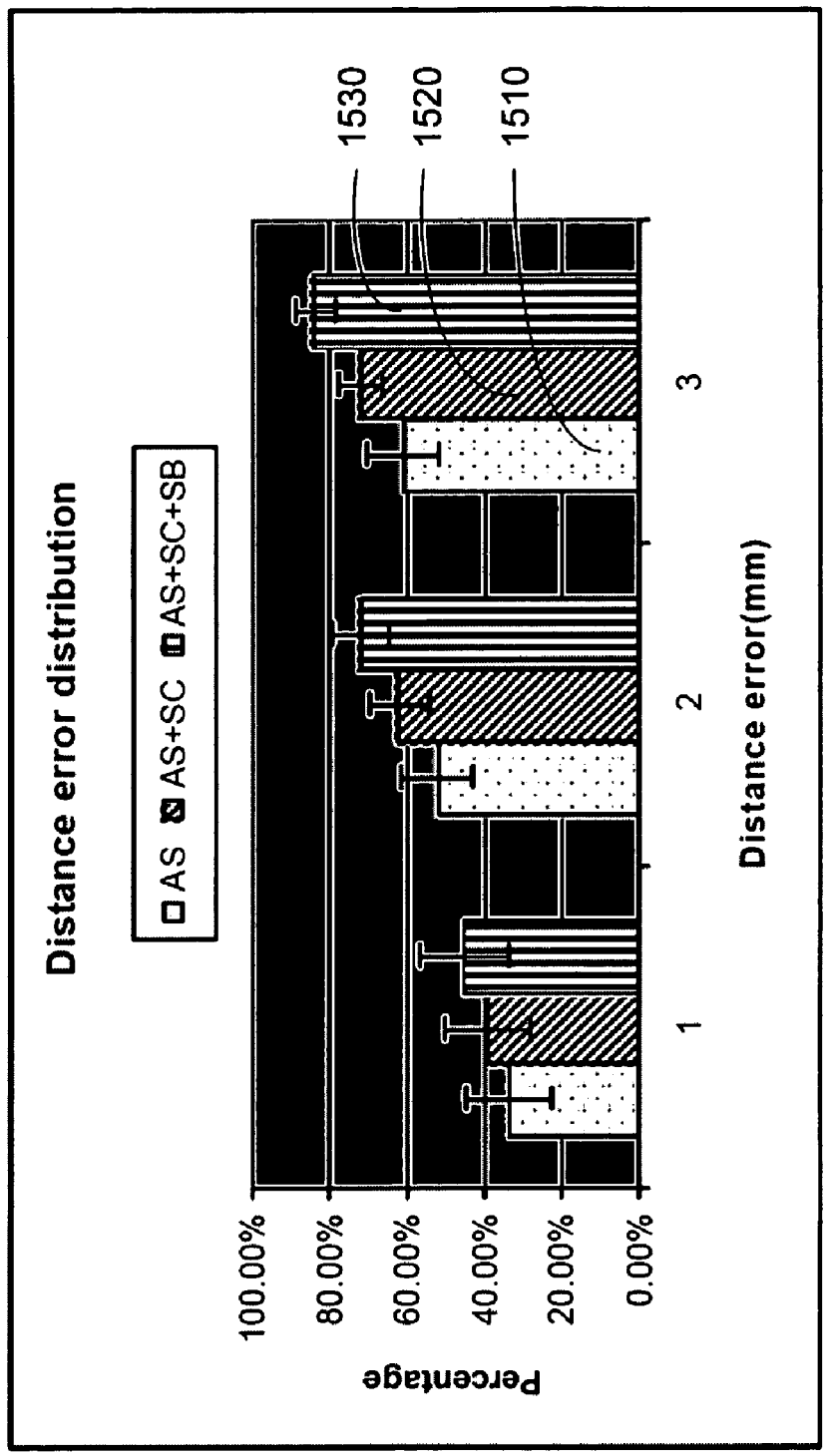
FIG. 15 shows distance error distributions according to one embodiment of the present invention.

To evaluate and compare the effectiveness of the various elements of the invented method(s), three different embodiments of the present invention were evaluated with the same initial contours: 1) the accumulative speed function algorithm (hereinafter "AS"), 2) the accumulative speed function algorithm with an extension including the shape constraints (hereinafter "AS+SC"), and 3) the accumulative speed function algorithm with extensions including the shape constraints and the stiff band algorithm (hereinafter "AS+SC+SB"). Table 3 lists the quantitative results obtained from the 6 CT liver volumes, where each volume was identified by a subject number in Subject column. The similarity index and mean/median distance measure were calculated for each subject. As shown in Table 3, the average similarity index increases from 0.901 to 0.923 to 0.945 and the mean/median distance improves from 5.654 mm/1.872 mm to 4.622 mm/1.203 mm to 2.028 mm/0.962 mm when the liver segmentations were conducted with the AS, the AS+SC, and the AS+SC+SB, respectively. The results indicates the improvement of the liver segmentation with the addition of the shape constraints and the stiff band algorithm for the CT image volumes. Referring to FIG. 15, the average percentage and the standard deviation of the points that had a distance value less or equal to 1 mm, 2 mm, and 3 mm are shown for the three embodiments. The results shown in FIG. 15 display that the percentages increase with the addition of the shape constraints and the stiff band algorithm. For example, as shown in FIG. 15, the average percentages 1510, 1520 and 1530 of a point that has a distance value less or equal to 3 mm are about 61% for the AS segmentation, about 72% for the AS+SC segmentation, and about 84% for the AS+SC+SB segmentation, respectively.

Figure 16:
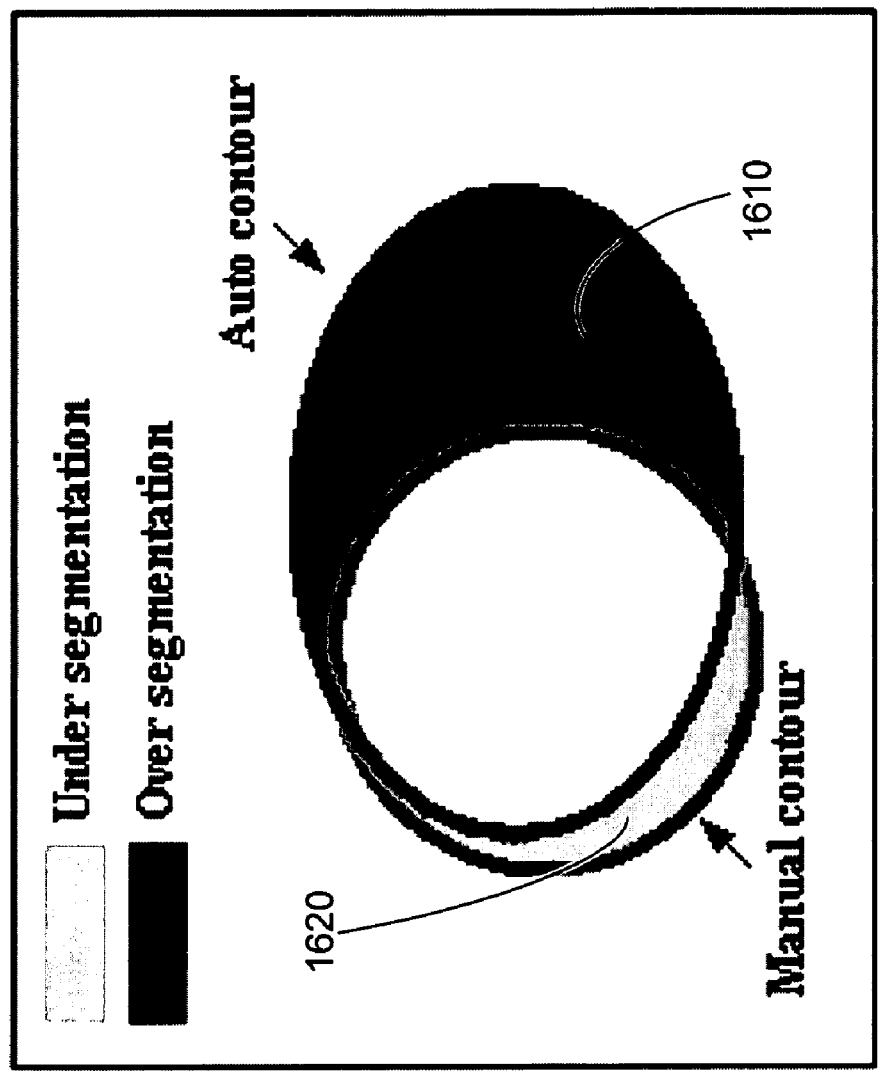
FIG. 16 shows schematically a definition of over- and under-segmented regions according to one embodiment of the present invention.

In one embodiment, ratios between over-segmented and under-segmented regions were calculated for estimating whether the invented algorithms over- or under-segment the liver either manually or semi-automatically. The areas of over-segmentation 1610 and under-segmentation 1610 are defined in FIG. 16. In one embodiment, the total area of over-segmented and under-segmented regions was calculated by summation over all the slices. The ratio was then obtained by dividing the total area of over-segmented by the total area of under-segmented. The results for all the six subjects are listed in Table 4. It is clear that the three segmentation procedures (AS, AS+SC, AS+SC+SB) are prone to over-segmentation instead of under-segmentation because all the ratios were bigger than one. However, the average ratio decreases with the addition of the shape constraints and the stiff band algorithm. For example, the average ratios are 11.031, 6.309, 2.271 for the AS segmentation, the AS+SC segmentation, and the AS+SC+SB segmentation, respectively, as shown in Table 4. This, together with the improvement of the overall segmentation quality, indicates that the shape constraints and the stiff band algorithm added to the accumulative speed function algorithm helped in reducing the leaking of the contours into adjacent structures and thus helped in reducing over-segmentation. This is consistent with visual observations.

TABLE 3

The similarity indices and the mean/median distance errors for three different segmentation procedures we have tested.

| Subject | AS | | | AS + SC | | | AS + SC + SB | | |
|---|---|---|---|---|---|---|---|---|---|
| | Similarity index | Mean Distance (mm) | Median Distance (mm) | Similarity index | Mean Distance (mm) | Median Distance (mm) | Similarity index | Mean Distance (mm) | Median Distance (mm) |
| 1 | 0.905 | 8.080 | 2.459 | 0.929 | 5.971 | 1.542 | 0.945 | 3.270 | 1.217 |
| 2 | 0.912 | 5.049 | 2.177 | 0.925 | 5.651 | 1.310 | 0.951 | 2.000 | 1.101 |
| 3 | 0.877 | 5.936 | 2.459 | 0.926 | 3.312 | 1.030 | 0.950 | 1.809 | 0.687 |
| 4 | 0.919 | 2.967 | 0.827 | 0.927 | 2.359 | 0.733 | 0.948 | 1.185 | 0.616 |
| 5 | 0.894 | 4.820 | 1.279 | 0.908 | 5.033 | 1.048 | 0.928 | 1.764 | 1.048 |
| 6 | 0.900 | 7.074 | 2.034 | 0.920 | 5.409 | 1.557 | 0.950 | 2.141 | 1.101 |
| Average | 0.901 | 5.654 | 1.872 | 0.923 | 4.622 | 1.203 | 0.945 | 2.028 | 0.962 |

TABLE 4

The ratios of over-segmented and under-segmented regions for three different segmentation procedures.

| Subject | AS Over-segmentation/ Under-segmentation | AS + SC Over-segmentation/ Under-segmentation | AS + SC + SB Over-segmentation/ Under-segmentation |
|---|---|---|---|
| 1 | 9.943 | 5.064 | 1.842 |
| 2 | 9.395 | 6.047 | 1.911 |
| 3 | 22.402 | 9.049 | 2.647 |
| 4 | 5.289 | 3.036 | 1.152 |
| 5 | 9.523 | 7.348 | 3.283 |
| 6 | 9.636 | 7.307 | 2.789 |
| Average | 11.031 | 6.309 | 2.271 |

Clinical Evaluations

Donors: Eighteen subjects were selected as living donors for liver transplantation (8 men, age range: 25-46 years, mean age: 34 years, 10 women, age range: 27-40 years, mean age, 33 years). Those donors eligible for inclusion in the study were those who passed the preoperative screening and whose graft was weighed after surgery. Eleven donors underwent left lateral segment (II-III), two left lobe (II-II-IV), and five right lobe (V-VI-VII-VIII) resections. The institutional review board approved this retrospective study and waived informed consent.

MR imaging: The abdominal images were acquired during the preoperative screening on a 1.5 Tesla whole-body MR scanner (Gyroscan NT Intera T15, Philips Medical Systems, Best, The Netherlands). To measure the liver volumes, a contrast-enhanced T1-weighted fast field echo sequence was used. Acquisition parameters were: field of view=400*320 mm, acquisition matrix=304*194, reconstruction matrix=512*512, slice thickness=7 mm, slice gap=1-3 mm, TR=135 ms, TE=2.9 ms, flip angle=60° acquisition time=14 s per dynamic. Twenty slices were acquired to cover the whole liver. The echo time was chosen to create a phase cancellation between fat and water signals. This creates a black outline at the border of the liver, where the voxels contain both liver tissue and peritoneal fat. This effect was beneficial for the segmentation. A 0.1 mmol/kg dose of gadodiamide (Omniscan, Amersham Health PLC, Cork, Ireland) was injected at a rate of 2.5 mL/s with a power injector (Spectris, Medrad Inc., Indianola, Pa.). Four sets of images were acquired before administration of the contrast agent, during the arterial, portal venous and delayed phases. Only the images of the portal venous phase were used for the segmentation.

Figure 17:
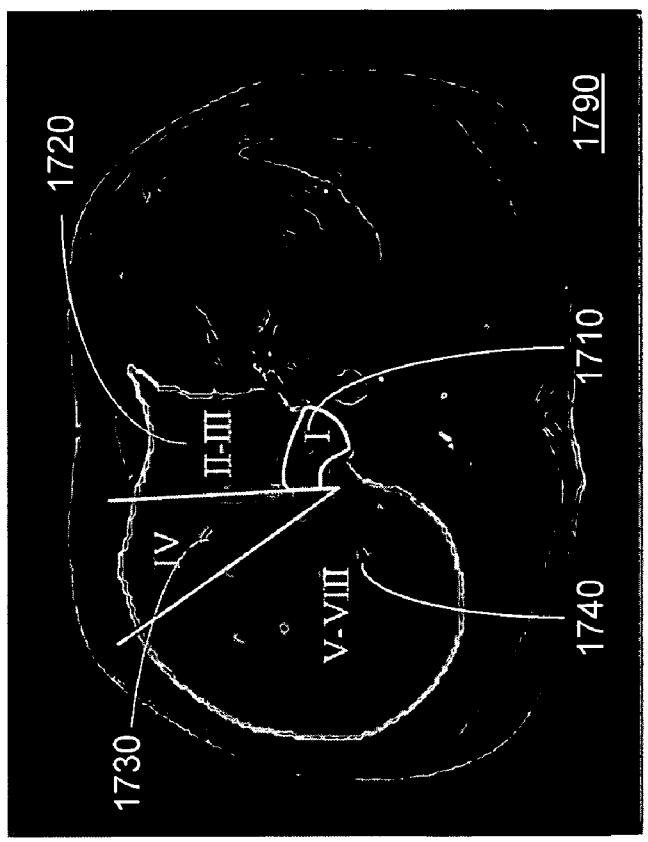
FIG. 17 shows liver segmentations from a MR image according to one embodiment of the present invention: (a) manual, and (b) semi-automatic.
Figure 17:
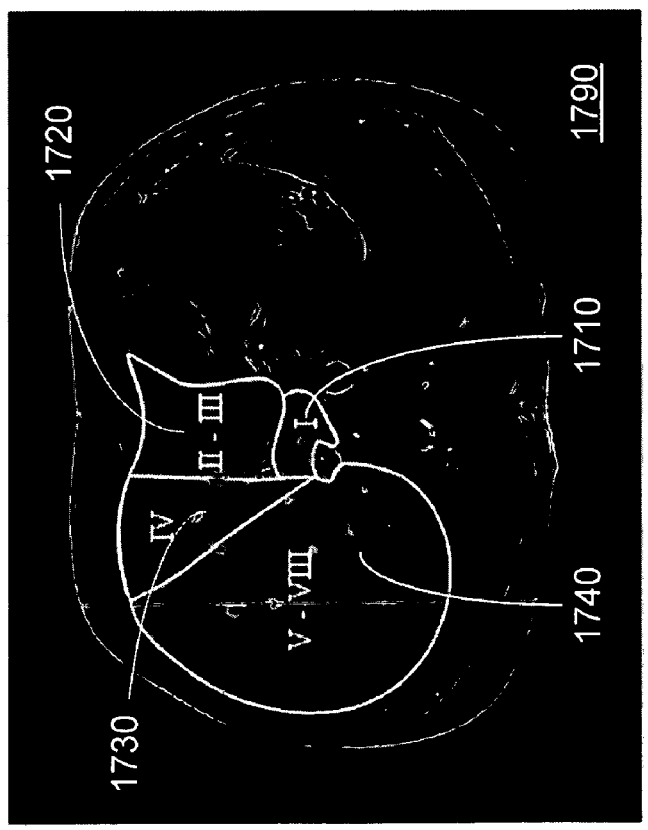

Manual segmentation: Two independent trained observers, named L.H. and I.L., having 2 years of experience with liver MRI, were involved in practicing the current invention. Each performed two manual segmentations retrospectively on each patient. To prevent bias, the observers were blinded to the results of their first measurement, of the other observer, of the other segmentation method, and of the actual graft volume, respectively. The measurements were performed in random order and measurements in the same patient were performed with a time interval of at least two weeks. Manual segmentation was performed on a General Electrics Advantage Window workstation (GE Medical Systems, Milwaukee, Wis.). Additionally, a method described by Heymsfield et al [26] to measure a volume of a whole liver and adapted by Kawasaki et al [27] for the measurement of the segmental volumes was used. FIG. 17 shows a representative transverse contrast-enhanced T1-weighted fast field echo (135/2.9 with 60° flip angle) MR image with a liver separated into a caudate lobe (I) 1710, a left lateral segment (II-III) 1720, a left medial segment (IV) 1730, and a right lobe (V-VI-VII-VIII) 1740. On each slice, the outlines of the caudate lobe (I) 1710, the left lateral segment (II-III) 1720, the left medial segment (IV) 1730, and the right lobe (V-VI-VII-VIII) 1740 were manually drawn with, in one embodiment, a computer mouse, as shown in FIG. 17a. The anatomical landmarks used to separate the liver segments were the gallbladder and the middle hepatic vein for the right lobe-left medial segment separation, the falciform ligament for the left medial segment-left lateral segment separation, and the inferior vena cava, the portal bifurcation, and the ligamentum venosum for the caudate lobe delineation [28]. On the slices where the anatomical landmarks were not visible, the separation lines were mentally interpolated. The volume corresponding to each outline was obtained by multiplying its area by the slice thickness, where gaps were included. The total volumes of the liver segments were obtained by adding the contributions on all the slices. For each measurement, the total segmentation time was recorded.

Semi-automatic segmentation: The same two observers each performed two semi-automatic segmentations retrospectively on each patient. The same measures as those in the manual segmentation were taken to prevent bias. In one embodiment of the current invention, semi-automatic liver segmentation software was developed on a Windows 2000 workstation with the Interactive Data Language (IDL 5.5, Research Systems Inc., Boulder, Colo.) programming language. The software includes a user-friendly graphical user interface for allowing easy interaction. The software incorporated the accumulative speed function algorithm of the present invention. The overall segmentation process requires 1) placing initialization circle(s) on each slice, 2) running the algorithm, and 3) inspecting and possibly modifying manually the contours obtained with the segmentation algorithm.

Two lines were drawn to separate the liver into segments. As for the manual segmentation, the liver was separated into the caudate lobe (I) 1710, the left lateral segment (II-III) 1720, the left medial segment (IV) 1730, and the right lobe (V-VI-VII-VIII) 1740, as shown in FIG. 17*a*. For the semi-automatic segmentations, the separation was done by drawing lines on a few slices on which the landmarks were visible. These lines were then automatically interpolated to create surfaces that separate the liver into segments, such as a caudate lobe (D) 1710, a left lateral segment (II-III) 1720, a left medial segment (IV) 1730, and a right lobe (V-VI-VII-VIII) 1740, as shown in FIG. 17*b*. The caudate lobe (I) 1710 was manually delineated. Each measurement was timed. The initialization time, the computing time (interaction free), and the time for manual corrections and delineation of the liver segments were recorded separately. The total time was the sum of these three times. The interaction time does not include the computing time.

Surgical procedure: In one embodiment, recipients received a left lateral segment (II-III), left lobe (II-III-IV) or right lobe (V-VI-VII-VIII) graft [29]. Intraoperative sonography was used in the donor to delineate the intrahepatic vascular anatomy. The arterial, venous and biliary elements of the corresponding graft were isolated. Parenchymal transection was done without inflow occlusion. The liver graft was flushed through a portal vein cannula using successively 4° C.-cold Hartmann and University of Wisconsin solution. The corresponding hepatic artery was ligated next and the corresponding hepatic vein was transected and sutured progressively. The graft was weighed after completing the flushing and the preparation work, using a calibrated scale. The graft weight was converted into graft volume assuming a unit density for the liver [30].

Effect of the slice thickness: The influence of the slice thickness on the volumes measured with the semi-automatic segmentation algorithm was assessed in five patients with normal liver. In each patient, the contrast-enhanced T1-weighted fast field echo sequence used for preoperative screening of the living donors was acquired three times with increasing slice thickness (5 mm, 7 mm, and 10 mm). The slice gap (1 mm) was not modified. For each sequence, one observer (L.H.) performed two semi-automatic segmentations as described above. The estimated volumes of the caudate lobe (I), the left lateral segment (II-III), the left medial segment (IV), the right lobe (V-VI-VII-VIII), and the total liver, averaged over the five patients, were reported for the three slice thicknesses. The influence of slice thickness on the number of slices necessary to cover the whole liver, and on the interaction and total segmentation times was studied.

Statistical analysis: The total time for manual segmentation was compared with the total and interaction times for semi-automatic segmentation. For the semi-automatic segmentation method, the percentages of the total time devoted to initialization, computing, and manual corrections and delineation of the liver segments were calculated. For accuracy comparisons, the graft volumes (±standard deviation) measured during surgery and estimated with the manual and semi-automatic segmentations (mean of the 4 observations, 2 by each of the 2 observers) were averaged over all the donors. In addition, for each donor, the difference between the actual graft volume (measured during surgery) and the estimated one (mean of the 4 observations, 2 by each of the 2 observers) was calculated separately for the manual and semi-automatic segmentations. These differences were plotted against the averages of the actual and estimated volumes. Scatter plots were drawn to illustrate the relationship between the actual and estimated graft volumes. The identity line was indicated on these plots. The number of cases where the semi-automatic segmentation algorithm improved the accuracy of the estimation was counted. The statistical analysis was performed with a method described by Bland and Altman [31, 32]. The 95% limits of agreement were calculated separately for the actual volume versus the volume determined with manual segmentation and the actual volume versus the volume determined with semi-automatic segmentation. As the measurement error was proportional to the mean, a logarithmic transformation (natural logarithm) was used [33]. Independence after the transformation was checked on a Bland and Altman plot [31, 32]. Normality of the differences was checked with the Kolmogorov-Smirnov test. The Kolmogorov-Smirnov test was a test to determine if two datasets differ significantly, as known to people skilled in the art. As for each segmentation method the mean of four measurements was used, the variance of the differences was corrected for repeated measurements [32]. The within-subject variance was calculated with one-way analysis of variance. The 95% limits of agreement were calculated as (mean difference)±1.96 (adjusted standard deviation of the differences). The limits of agreement expressed in a logarithmic scale were transformed back into a natural scale using an exponential function. As the calculations were performed on the log transformed quantities, these limits of agreement needed to be interpreted in terms of ratios. The Bland and Altman's repeatability coefficient [32, 34] was used as a measurement of inter- and intra-observers agreement on the manual and semi-automatic segmentations. The calculations were carried out separately on the caudate lobe (I), the left lateral segment (II-III), the left medial segment (IV), the right lobe (V-VI-VII-VIII), and the whole liver. As for each of these tests the range of values was small, logarithmic transformation was not necessary. For the measurement of inter-observer agreement, only the first measurement of each observer was taken into account. Intra-observer agreement was measured for both observers. The repeatability coefficient was calculated as 2.77 times the within subject standard deviation ($s_w$). By definition, the measurement error was smaller than the repeatability coefficient for 95% of the observations. Therefore, a smaller repeatability coefficient indicates a better repeatability of the method.

Time measurements: The times (mean±standard deviation) averaged over the four observations obtained according to one embodiment of the present invention are given in Table 5. The interaction time was reduced from about 25 minutes for the manual segmentation to about 5 minutes for the semi-automatic segmentation. For the semi-automatic segmentation method, interaction time (about 297 seconds) represents 67% of the total time (about 440 seconds)and was divided into time (about 95 seconds) for initialization of the contours (21% of the total time) and time (about 202 seconds) for corrections and placing of the separation lines (46% of the total time). Computing time (about 144 seconds) represents 33% of the total time (about 297 seconds).

TABLE 5

Segmentation times.

| | | Time (s) |
|---|---|---|
| Semi-Automatic Segmentation | Initialization (step 1) | 95 ± 9 |
| | Computation (step 2) | 144 ± 10 |
| | Corrections and Separations (step 3) | 202 ± 37 |
| | Interaction (steps 1 and 3) | 297 ± 39 |
| | Total (steps 1-3) | 440 ± 46 |
| Manual Segmentation | | 1497 ± 137 |

Figure 18:
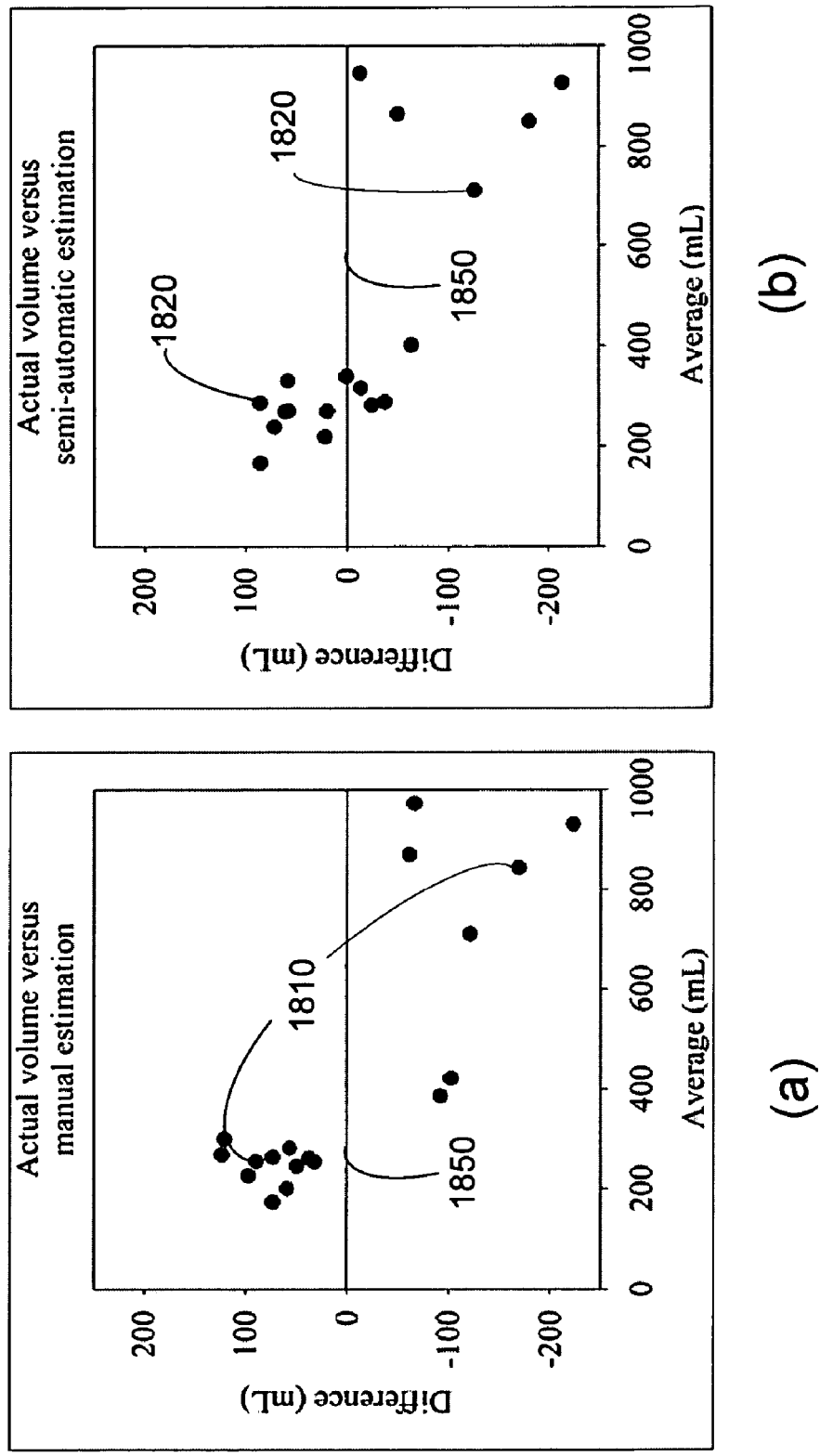
FIG. 18 shows differences between an actual volume and an estimated volume versus their averages according to one embodiment of the present invention: (a) manual, and (b) semi-automatic.
Figure 19:
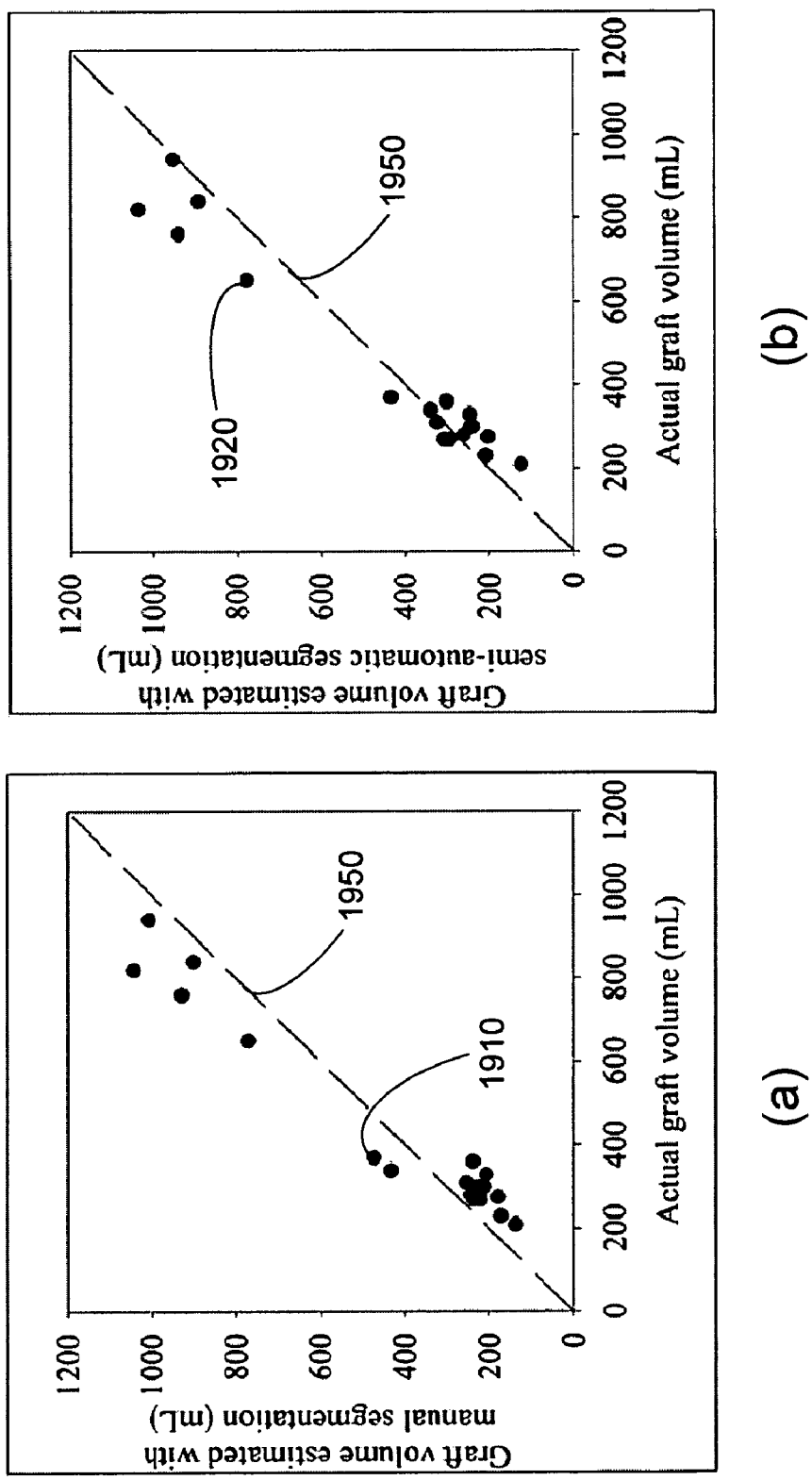
FIG. 19 shows scatter plots of an actual volume versus an estimated volume according to one embodiment of the present invention: (a) manual, and (b) semi-automatic.

Accuracy measurements: The mean graft volumes (±standard deviation) measured during surgery and estimated with the manual and semi-automatic segmentations (mean of the 4 observations) obtained according to one embodiment of the present invention are given in Table 6. The differences between the actual volume and the estimated one ranged from about −223 ml to about +123 ml for manual segmentation, and from about −214 ml to about +86 ml for semi-automatic segmentation, respectively. The difference 1810 between the actual volume and the manually estimated volume against their averages is shown in FIG. 18*a*, while the difference 1820 between the actual volume and the semi-automatically estimated volume against their averages is shown in FIG. 18*b*. The dispersion of the difference 1820 for the semi-automatic segmentation around the horizontal axis 1850 is smaller than that for manual segmentation. Increase of measurement error with increasing volumes was observed for both methods, as shown in FIGS. 18*a* and 18*b*. Larger grafts (left or right lobe) were overestimated. FIGS. 19*a* and 19*b* show the scatter plots of the actual volume versus the manually estimated volume and of the actual volume versus the semi-automatically estimated volume, respectively, according to one embodiment of the present invention, where the experimental points 1920 are closer to the identity line 1950 for the semi-automatic than the experimental points 1910 for the manual segmentation.

TABLE 6

Actual and estimated graft volumes.

| | Actual Volume (ml) | Estimated Volume (ml) Manual Segmentation | Estimated Volume (ml) Simi-Automatic Manual Segmentation |
|---|---|---|---|
| Left Lateral Segment Graft | 285 ± 42 | 211 ± 36 | 250 ± 58 |
| Left Lobe Graft | 355 ± 21 | 452 ± 29 | 386 ± 67 |
| Right Lobe Graft | 802 ± 107 | 930 ± 106 | 919 ± 95 |

Semi-automatic segmentation improved the graft volume estimation in about 15 out of the 18 cases. After logarithmic transformation, the dependence of the measurement errors on the mean was removed for both comparisons. The Kolmogorov-Smirnov test applied to the logarithmic differences did not lead to the rejection of the normality hypotheses. It was obtained that $p=0.786$ for the actual volume versus the manual segmented volume and $p=0.828$ for the actual volume versus the semi-automatic segmented volume, respectively. The mean ($\bar{d}$), variance ($s_{\bar{d}}^2$), and standard deviation ($s_{\bar{d}}$) of the differences, the within-subject variance ($s_w^2$), the adjusted variance ($s_d^2$) and the standard deviation ($s_d$) are given in Table 7 for both tests. All the values in the table, excepted in the last row, are expressed in the logarithmic scale. The 95% limits of agreement are also indicated in logarithmic and natural scales. As listed in Table 7, the mean difference ($\bar{d}=0.121$) for the manual segmentation is greater than that ($\bar{d}=0047$) for the semi-automatic segmentation. The within-subject variance ($s_w^2=0.0003$) for the manual segmentation is greater than that ($s_w^2=0.012$) for the semi-automatic segmentation. The smaller within-subject variance ($s_w^2=0.0003$) obtained with the semi-automatic segmentation is a first indicator of which the invented method(s) has the better repeatability. The ratio of (actual graft volume)/(estimated graft volume) is in a range of about 0.651-1.957 for the manual segmentation and about 0.686-1.601 for the semi-automatic segmentation, respectively. Because the 95% limits of agreement for the semi-automatic segmentation are closer to 1 than that for the manual segmentation, the accuracy of the former is higher.

TABLE 7

Accuracy measurements.

| | Actual Volume versus Manual Segmentation | Actual Volume versus Semi-Automatic Segmentation |
|---|---|---|
| $\bar{d}$ | 0.121 | 0.047 |
| $s_{\bar{d}}^2$ | 0.07 | 0.045 |
| $s_{\bar{d}}$ | 0.264 | 0.211 |
| $s_w^2$ | 0.012 | 0.003 |
| $s_d^2$ | 0.079 | 0.047 |
| $s_d$ | 0.281 | 0.216 |
| 95% limits of agreement (log) | (−0.429, 0.671) | (−0.377, 0.471) |
| 95% limits of agreement (natural) | (0.651, 1.957) | (0.686, 1.601) |

TABLE 8

Repeatability coefficients.

| | | Manual Segmentation | Semi-Automatic Segmentation |
|---|---|---|---|
| Caudate Lobe (I) | Intra-observer 1 | 14 | 15 |
| | Intra-observer 2 | 5 | 14 |
| | Inter-observer | 22 | 12 |
| Left Lateral Segment (II-III) | Intra-observer 1 | 59 | 43 |
| | Intra-observer 2 | 31 | 29 |
| | Inter-observer | 83 | 32 |
| Left Medial Segment (IV) | Intra-observer 1 | 75 | 40 |
| | Intra-observer 2 | 37 | 33 |
| | Inter-observer | 68 | 43 |

TABLE 8-continued

Repeatability coefficients.

|  |  | Manual Segmentation | Semi-Automatic Segmentation |
|---|---|---|---|
| Right Lobe (V-VI-VII-VIII) | Intra-observer 1 | 126 | 48 |
|  | Intra-observer 2 | 41 | 36 |
|  | Inter-observer | 192 | 71 |
| Whole Liver | Intra-observer 1 | 134 | 64 |
|  | Intra-observer 2 | 60 | 52 |
|  | Inter-observer | 192 | 75 |

Repeatability measurements: The repeatability coefficients for both manual and semi-automatic segmentations are listed in Table 8. The smaller the repeatability coefficients, the better the repeatability is. As shown in Table 8, the repeatability coefficients for the semi-automatic segmentation are smaller than those for the manual segmentation for all the segments excepted for the caudate lobe (I). The semi-automatic segmentation method has the better repeatability, compared with the manual segmentation method.

Effect of the slice thickness: The estimated volumes of the caudate lobe (I), the left lateral segment (II-III), the left medial segment (IV), the right lobe (V-VI-VII-VIII), and the whole liver, the number of slices, the total and interaction times, averaged over the five patients are given in Table 9 for three different slice thicknesses. Values in the table cells are expressed as the form of mean±standard deviation. A decrease of the mean estimated volume with increasing slice thickness is observed for the left lateral segment, the right lobe, and the whole liver, respectively. As shown in Table 9, when the slice thickness is doubled from about 5 mm to about 10 mm, the mean estimated volumes decrease by about 8%, about 4%, and about 5%, for the left lateral segment, the right lobe, and the whole liver, respectively. No specific trend was observed for the caudate lobe and the left medial segment. As with thinner slices, more slices are necessary to cover the whole liver, the interaction and total times are higher.

TABLE 9

Effect of slice thickness.

|  |  | 5 mm Slices | 7 mm Slices | 10 mm Slices |
|---|---|---|---|---|
| Estimated Volume (ml) | Caudate Lobe | 15 ± 5 | 16 ± 4 | 15 ± 4 |
|  | Left Lateral Segment | 201 ± 81 | 195 ± 82 | 184 ± 78 |
|  | Left Medial Segment | 133 ± 50 | 137 ± 48 | 135 ± 43 |
|  | Right Lobe | 887 ± 101 | 870 ± 97 | 847 ± 92 |
|  | Whole Liver | 1239 ± 194 | 1220 ± 192 | 1182 ± 177 |
| Number of Slices |  | 31 ± 3 | 23 ± 2 | 17 ± 2 |
| Segmentation Time (s) | Interaction Time | 352 ± 36 | 289 ± 36 | 252 ± 43 |
|  | Total Time | 634 ± 47 | 498 ± 41 | 402 ± 47 |

In summary, the present invention, among other unique things, discloses system and methods for segmentation of an organ of a living subject with a variable shape and boundary and surrounded by structures and tissues in connection with an image containing the organ. In one embodiment, a method utilizes an accumulative speed function that is capable of accumulating spatial and temporal information of a propagating front of a contour so as to stop the front in a true boundary of the organ. One advantage of the accumulative speed function over traditional speed function is that a base speed function is defined so that it is not identically equal to zero over the organ boundary and still stops the front permanently, thus addressing the leakage problem reported by others when dealing with front propagation methods for image segmentation. The method has been implemented both manually and semi-automatically. The semi-automatic segmentation method significantly reduces the amount of segmentation time while improving both accuracy and repeatability for liver transplantations. Other applications of the invented method include the determination of the segmental volumes before partial hepatectomy for tumors, and the monitoring of liver regeneration.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1] K. T. Bae, M. L. Giger, C. Chen, and C. E. Kahn Jr., "Automatic segmentation of liver structure in CT images", *Medical Physics*, vol. 20, no. 1, pp. 71-78, 1993.

[2] L. Gao, D. G. Heath, B. S. Kuszyk, and E. K. Fishman, "Automatic liver segmentation technique for three-dimensional visualization of CT Data", *Radiology*, vol. 201, pp. 395-364, 1996.

[3] S. Chemouny, H. Joyeux, B. Masson, F. Borne, M. Jaeger, and O. Monga, "Advanced 3D image processing techniques for liver and hepatic tumors location and volumetry", *Proceedings of SPIE'1999: Image Processing*, vol. 3661, pp. 761-771, 1999.

[4] N. Inaoka, H. Suzuki, and M. Fukuda, "Hepatic blood vessel recognition using anatomical knowledge", *Proceedings of SPIE'*1992: Medical Imaging, vol. 1652, pp. 509-513, 1992.

[5] E. K. Fishman, B. S. Kuszyk, D. G. Heath, and L. Gao, "Surgical planning for liver resection", *IEEE Computer*, vol. 29, no. 1, pp. 64-72, 1996.

[6] J. Montagnat and H. Delingette, "Volumetric medical images segmentation using shape constrained deformable models", CVRMed-MRCAS, pp. 13-22. Springer Verlag. *Lecture Notes in Computer Science*, vol. 1205, 1997.

[7] L. Soler, H. Delingette, G. Malandain, J. Montagnat, N. Ayache, C. Koehl, O. Dourthe, B. Malassagne, M. Smith, D. Mutter, and J. Marescaux, "Fully automatic anatomical, pathological, and functional segmentation from CT scans for hepatic surgery", *Computer Aided Surgery*, vol. 6, pp. 131-142, 2001.

[8] J. Chou, S. Chen, G. S. Sudakoff, K. R. Hoffmann, C. Chen, and A. H. Dachman, "Image fusion for visualization of hepatic vasculatures and tumors, *Proceedings of SPIE'*1995: *Medical Imaging*, vol. 2435, pp. 157-163, 1995.

[9] J. K. Varma, J. Durgan, and K. Subramanyan, "Semi-automatic procedure to extract couinaud liver segments from multi-slice CT data", *Proceedings of SPIE'2003: Visualization, Image-Guided Procedures*, and Display, vol. 5029, pp. 561-568, 2003.

[10] S. Pan, and B. M. Dawant, "Automatic 3D segmentation of the liver from abdominal CT images: a level set approach", *Proceedings of SPIE'2001: Medical Imaging*, vol. 4322, pp. 128-138, 2001.

[11] B. M. Dawant, S. Pan, and R. Li, "Robust segmentation of medical images using geometric deformable models and a dynamic speed function," *Proceedings of MICCAI'*2001, pp. 1040-1047, 2001.

[12] M. Kass, A. Witkin, and D. Terzopoulos, "Snakes: active contour models." *International Journal of Computer Vision*, vol. 1, no. 4, pp. 321-331, 1988.

[13] J. A. Sethian, "Numerical algorithms for propagating interfaces: Hamilton-Jacobi equations and conservation laws", *Journal of Differential Geometry*, vol. 31, pp. 131-161, 1990.

[14] R. Malladi, J. A. Sethian, and B. C. Vemuri, "Shape modeling with front propagation: A level set approach", *IEEE Trans. Pattern Analysis and Machine Intelligence*, vol. 17, no. 2, pp. 158-175, 1995.

[15] V. Caselles, R. Kimmel, and G. Sapiro, "Geodesic active contours", *Proceedings of ICCV*, pp. 694-699, 1995.

[16] K. Siddiqi, Y. B. Lauziere, A. Tannenbaum, and S. W. Zucker, "Area and length minimizing flows for shape segmentation", *IEEE Trans. Medical Imaging*, vol. 7, no. 3, pp. 433-443, 1998.

[17] J. S. Suri, "White matter/gray matter boundary segmentation using geometric snakes: A fuzzy deformable model", Proceedings of ICAPR '2001, pp. 331-338, 2001.

[18] N. Paragios and R. Deriche, "Geodesic active regions: a new framework to deal with frame partition problems in computer vision", *Journal of Visual Communication and image representation*, vol. 13, pp. 249-268, 2002.

[19] T. F. Chan, and L. A. Vese, "Active contours without edges", *IEEE Trans. Image Processing*, vol. 10, no. 2, pp. 266-276, 2001.

[20] A. Yezzi, A. Tsai, and A. Willsky, "A fully global approach to image segmentation via coupled curve evolution equation," *Journal of visual communication and image representation*, vol. 13 pp. 195-216, 2002.

[21] M. Leventon, W. E. Grimson, and O. Faugeras, "Statistical shape influence in geodesic active contours", *Proceedings of CVPR*, vol. 1, pp. 1316-1324, 2000

[22] A. Tsai, A. Yezzi, W. Wells III, C. Tempany, D. Tucker, A. Fan, W. E. Grimson, and A. Willsky, "Model-based curve evolution technique for image segmentation", *Proceedings of CVPR*, vol. 1, pp. 463-468, 2001.

[23] D. Adalsteinsson and J. A. Sethian, "The fast construction of extension velocities in level set methods", *Journal of Computational Physics*, vol. 148, no. 1, pp. 2-22, 1999.

[24] J. A. Sethian, "A fast marching level set method for monotonically advancing fronts", *Proceedings of the National Academy of Sciences*, vol. 93, no. 4, pp. 1591-1595, 1996.

[25] T. F. Chan and L. A. Vese, "Image segmentation using level sets and piecewise-constant Mumford-Shah model," *UCLA CAM Report* 00-14, 2000.

[26] S. B. Heymsfield, T. Fulenwider, B. Nordlinger, R. Barlow, P. Sones and M. Kutner, "Accurate measurement of liver, kidney, and spleen volume and mass by computerized axial tomography." *Ann Intern Med*, vol. 90 pp. 185-187, 1979.

[27] S. Kawasaki, M. Makuuchi, H. Matsunami et al, "Pre-operative measurement of segmental liver volume of donors for living related liver transplantation." *Hepatology*, vol. 18 pp. 1115-1120, 1993.

[28] H. Strunk, G. Stuckmann, J. Textor and W. Willinek, "Limitations and pitfalls of Couinaud's segmentation of the liver in transaxial Imaging." *Eur Radiol*, vol. 13 pp. 2472-2482, 2003.

[29] J. P. Lerut, O. Ciccarelli, F. M. Roggen et al, "Adult-to-adult living related liver transplantation: initial experience." *Acta Gastroenterol Belg*, vol. 64 pp. 9-14, 2001.

[30] D. H. Van Thiel, N. G. Hagler, R. R. Schade et al, "In vivo hepatic volume determination using sonography and computed tomography. Validation and a comparison of the two techniques." *Gastroenterology*, vol. 88 pp. 1812-1817, 1985.

[31] J. M. Bland and D. G. Altman, "Statistical methods for assessing agreement between two methods of clinical measurement." *Lancet*, vol. 1 pp. 307-310, 1986.

[32] J. M. Bland and D. G. Altman,. "Measuring agreement in method comparison studies." *Stat Methods Med Res*, vol. 8 pp. 135-160, 1999.

[33] J. M. Bland and D. G. Altman, "Measurement error proportional to the mean." *BMJ*, vol. 313 pp. 106, 1996.

[34] J. M. Bland and D. G. Altman, "Measurement error." *BMJ*, vol. 313 pp. 744, 1996.

What is claimed is:

1. A method for segmentation of an organ of a living subject with a variable shape and boundary and surrounded by structures and tissues in connection with an image containing the organ, wherein the boundary of the organ is embedded as a zero level set of an embedding function, $\Phi$, comprising the steps of:

a. initializing a contour inside the organ in the image;

b. introducing a speed function that is capable of accumulating spatial and temporal information of a propagating front of the contour, wherein the speed function has a term, $g_0$;

c. defining an image-dependent static term, $g_{base}$;

d. setting the term $g_0=g_{base}$;

e. computing $\{(x,y,z)|\Phi(x,y,z)=0\}$ at iteration n, so as to obtain a set of points in the zero level set of the embedding function $\Phi$, wherein n=1, 2, 3, . . . , and coordinates (x, y, z) represent a point on the propagating front of the contour;

f. retrieving the static term $g_{base}(x, y, z)$ for each of the set of points in the zero level set of the embedding function $\Phi$;

g. extending the retrieved static term $g_{base}(x, y, z)$ to a narrow band in which the embedding function $\Phi$ is computed so as to generate an extended term $g_{ext}$;

h. updating the term $g_0=g_0g_{ext}$ so as to update the speed function;

i. computing the embedding function $\Phi$ at iteration (n+1) using the updated speed function; and j. iteratively repeating steps (e)-(i) by a computer for a predetermined number of iterations or until the propagating front of the contour does not move, wherein the front of the contour corresponds to the boundary of the organ.

2. The method of claim 1, wherein the extending step comprises the step of computing the extended term $g_{ext}$ that satisfies an equation of $\nabla g_{ext} \cdot \nabla \theta = 0$, $\nabla \theta$ being a standard signed distance function computed from the zero level set of the embedding function $\Phi$.

3. The method of claim 2, wherein the computing step is performed with a fast marching method.

4. The method of claim 3, wherein the extended term $g_{ext}(x,y,z)=g_{base}(c(x,y,z))$ for points $(x,y,z)$ close to the zero level set, $c(x,y,z)$ being the closest point in the zero level set of the embedding function $\Phi$.

5. The method of claim 1, wherein the embedding function $\Phi$ is governed by a level set equation, $\Phi_t+F|\nabla\Phi|=0$, wherein the speed function $F=g_0(1-\epsilon\kappa)$.

6. The method of claim 1, wherein the embedding function $\Phi$ is governed by a level set equation, $\Phi_t-\text{Sign}(g_{base})((|g_0|-\epsilon\kappa)|\nabla\Phi|)=0$, wherein the speed function $F=-\text{Sign}(g_{base})(|g_0|-\epsilon\kappa)$ and $\text{Sign}(g_{base})$ is a sign function of $g_{base}$.

7. The method of claim 6, wherein the static term $g_{base}$ is in the form of $g_{base}=g_{grad}g_{gray}$, wherein $g_{grad}$ and $g_{grey}$ comprise intensity gradient information and gray value information of the image, respectively.

8. The method of claim 1, further comprising the step of localizing an inner boundary of the structures surrounding the organ as a shape constraint for the propagating front of the contour.

9. The method of claim 8, wherein the structures comprise a set of ribs.

10. The method of claim 9, wherein the localizing step comprises the steps of:

a. converting the image into a binary image;

b. localizing a skin surface from the converted binary image, wherein the localized skin surface comprises a skin circumference;

c. identifying a set of candidate pixels, $P_{candidate}=\{P_{candidate}(j)\}$, from the converted binary image, $j=1, 2, \ldots, N_c$, $N_c$ being the number of the set of candidate pixels $P_{candidate}$;

d. determining a set of rib pixels, $P_{rib}=\{P_{rib}(i)\}$, from the set of candidate pixels $P_{candidate}$, each of the set of rib pixels $P_{rib}$ corresponding to one of the set of ribs in the converted binary image, $i=1, 2, \ldots, N_r$, $N_r$ being the number of the set of rib pixels $P_{rib}$;

e. segmenting the set of rib pixels $P_{rib}$ into a plurality of sections, $S=\{S(k)\}$, along the skin circumference in the converted binary image, $k=1, 2, \ldots, N_s$, $N_s$ being the number of the plurality of sections S;

f. calculating distances of each rib pixel in a segmented section $S(k)$ to its closest skin pixels on the skin circumference in the segmented section $S(k)$ so as to obtain the mean value $\overline{D}_{skin}(k)$ and the standard deviation $D_{std}(k)$ of these distances in the segmented section $S(k)$, respectively, $k=1, 2, \ldots, N_s$;

g. defining a skin-rib distance, $d_{skin-rib}(k)=\overline{D}_{skin}(k)+2D_{std}(k)$ for the segmented section $S(k)$, $k=1, 2, \ldots, N_s$; and h. connecting the plurality of segmented sections S together to form the inner boundary of the plurality of ribs, $P_{in}=\{(x,y)|d(x,y)=Td_{skin-rib}(C\_Map(x,y))\}$, wherein $d(x,y)$ is distance of pixel $(x,y)$ to the skin circumference, $C\_Map(x,y)$ is the closest point of pixel $(x,y)$ on the skin circumference, and $Td_{skin-rib}$ is a lookup table that stores the skin-rib distance $d_{skin-rib}$ for each pixel along the skin circumference.

11. The method of claim 10, wherein the converting step comprises the step of thresholding the image with a threshold, $I_{skin}$.

12. The method of claim 11, wherein the set of rib pixels $P_{rib}=\{(x,y)|(x,y)\in P_{candidate}, \text{ and } D_{skin}(x,y)<d_{rib\ max}\}$, $d_{ribmax}$ being a maximum possible distance from a rib to the skin circumference.

13. The method of claim 10, wherein the connecting step is performed with an interpolation scheme.

14. The method of claim 1, further comprising the step of performing a stiff band algorithm on the propagating front of the contour.

15. The method of claim 14, wherein the performing step comprises the steps of:

a. defining a neighborhood for each of pixels $\{P_i\}$ along the contour, wherein $P_i$ represents the ith pixel on the contour, $i=1, 2, \ldots, N$, N being the number of the pixels, such that the neighborhood includes a set of pixels that are within $\pm\epsilon$ pixels, $\epsilon$ being a non-zero positive number;

b. dividing the pixels of the neighborhood for $P_i$ into a first set of pixels that are in front of pixel $P_i$ along a propagating direction of the contour, and a second set of pixels that are behind of pixel $P_i$ along the propagating direction of the contour;

c. defining a speed limit $\sigma$ to classify the neighborhood into several possible states;

d. for each state segmenting the neighborhood of $P_i$; and e. iteratively repeating steps (b)-(d) for all pixels $\{P_i\}$.

16. The method of claim 1, wherein the organ comprises at least a part of a liver, a heart, a kidney, a stomach, or a lung of a living subject.

17. The method of claim 1, wherein the image comprises a magnetic resonance image.

18. The method of claim 1, wherein the image comprises a computed tomography image.

19. Software stored on a computer readable medium for causing a computing system to perform functions that segment a region of interest of an organ in an image comprising:

a. initializing a contour inside the region of interest in the image;

b. introducing a speed function that is capable of accumulating spatial and temporal information of a propagating front of the contour, wherein the speed function has a term, $g_0$;

c. defining an image-dependent static term, $g_{base}$;

d. setting the term $g_0=g_{base}$;

e. computing $\{(x,y,z)|\Phi(x,y,z)=0\}$ at iteration n, so as to obtain a set of points in the zero level set of an embedding function $\Phi$, wherein $n=1, 2, 3, \ldots$, and coordinates $(x,y,z)$ represent a point on the propagating front of the contour;

f. retrieving the static term $g_{base}(x,y,z)$ for each of the set of points in the zero level set of the embedding function $\Phi$;

g. extending the retrieved static term $g_{base}(x,y,z)$ to a narrow band in which the embedding function $\Phi$ is computed so as to generate an extended term $g_{ext}$;

h. updating the term $g_0 = g_0 g_{ext}$ so as to update the speed function;

i. computing the embedding function $\Phi$ at iteration (n+1) using the updated speed function; and j. iteratively repeating steps (e)-(i) for a predetermined number of iterations or until the propagating front of the contour does not move, wherein the front of the contour corresponds to the boundary of the region of interest of an organ.

20. The software of claim 19, wherein the functions further comprise localizing an inner boundary of structures surrounding the organ as a shape constraint for the propagating front of the contour.

21. The software of claim 19, wherein the functions further comprise performing a stiff band algorithm on the propagating front of the contour.

22. Software stored on a computer readable medium for causing a computing system to perform functions that segment a region of interest of an organ in an image comprising:

a. initializing a contour inside the region of interest in the image;

b. introducing a speed function that is capable of accumulating spatial and temporal information of a propagating front of the contour; and c. evolving the contour toward the boundary of the organ using the introduced speed function so as to segment the organ, wherein the boundary of the organ is embedded as a zero level set of an embedding function, $\Phi$, governed by a level set equation;

wherein the evolving function comprises:

d. defining an image-dependent static term, $g_{base}$;

e. setting $g_0 = g_{base}$, wherein $g_0$ is a term used in the speed function;

f. computing $\{(x,y,z)|\Phi(x,y,z)=0\}$ at iteration n, so as to obtain a set of points in the zero level set of the embedding function $\Phi$, wherein n=1, 2, 3, ..., and coordinates (x, y, z) represent a point on the propagating front of the contour;

g. retrieving the static term $g_{base}(x,y,z)$ for each of the set of points in the zero level set of the embedding function $\Phi$;

h. extending the retrieved static term $g_{base}(x, y, Z)$ to a narrow band in which the embedding function $\Phi$ is computed so as to generate an extended term $g_{ext}$;

i. updating the term $g_0 = g_0 g_{ext}$ so as to update the speed function;

j. computing the embedding function $\Phi$, at iteration (n+1) using the updated speed function; and k. iteratively repeating steps (c)-(g) for a predetermined number of iterations or until the propagating front of the contour does not move.

23. The software of claim 22, wherein the functions further comprise localizing an inner boundary of the structures surrounding the organ as a shape constraint for a propagating front of a contour.

24. The software of claim 22, wherein the functions further comprise performing a stiff band algorithm on the evolution of a contour.

* * * * *